US006602644B2

(12) United States Patent
Matsushima et al.

(10) Patent No.: US 6,602,644 B2
(45) Date of Patent: Aug. 5, 2003

(54) TONER AND IMAGE FORMING METHOD

(75) Inventors: Asao Matsushima, Hachioji (JP); Meizo Shirose, Hachioji (JP); Tsuyoshi Uchida, Hachioji (JP); Hiroyuki Yamada, Hachioji (JP); Akira Ohira, Hachioji (JP); Shoichiro Ishibashi, Hachioji (JP); Shigenori Kohno, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/910,988

(22) Filed: Jul. 23, 2001

(65) Prior Publication Data

US 2002/0037468 A1 Mar. 28, 2002

(30) Foreign Application Priority Data

Aug. 2, 2000 (JP) ....................................... 2000/234642

(51) Int. Cl.$^7$ ........................ G03G 9/097; G03G 9/087; C08J 3/215

(52) U.S. Cl. ................................ 430/108.4; 430/110.1; 430/137.14; 430/137.11; 430/111.4

(58) Field of Search ........................... 430/110.2, 111.4, 430/137.11, 137.14, 108.4, 110.1

(56) References Cited

U.S. PATENT DOCUMENTS

| | | | | | |
|---|---|---|---|---|---|
| 5,965,316 | A | * | 10/1999 | Kmiecik-Lawrynowicz et al. | 430/137.14 |
| 5,976,755 | A | * | 11/1999 | Yoshida et al. | 430/110.2 |
| 6,180,307 | B1 | * | 1/2001 | Kmiecik-Lawrynowicz | 430/110.2 |
| 6,475,685 | B2 | * | 11/2002 | Uchida et al. | 430/108.4 |
| 2002/0146631 | A1 | * | 10/2002 | Nakamura et al. | 430/108.4 |

FOREIGN PATENT DOCUMENTS

| | | |
|---|---|---|
| JP | 05265252 | 10/1993 |
| JP | 09265210 | 10/1997 |

* cited by examiner

*Primary Examiner*—Christopher Rodee
(74) *Attorney, Agent, or Firm*—Muserlian, Lucas and Mercanti

(57) ABSTRACT

A toner for developing an electrostatic latent image is disclosed. The toner comprises a resin, a colorant and a releasing agent or a crystalline polyester compound, and the toner has crushability index from 0.1 to 0.8. The toner is preferably produced by sat-out/fusion-adherence of a composite resin particle and a colorant particle, the composite resin particle comprises polyester compound in a portion of the composite resin particle other than outermost layer

15 Claims, 1 Drawing Sheet

TONER AND IMAGE FORMING METHOD

FIELD OF THE INVENTION

The present invention relates to a toner for developing an electrostatic latent image and an image forming method.

BACKGROUND OF THE INVENTION

It has been known that technology for producing a toner for developing an electrostatic latent image, for example, a production of toner by a suspension polymerization has been practically performed.

However, the toner particle obtained by the suspension polymerization has a shortcoming that the toner is inferior in the fixing property since the toner has a spherical shape.

Besides, it has been known a method for obtaining an irregular-shaped, not spherical, toner particle in which a resin particle prepared by an emulsion polymerization process and a colorant particle are associated by coagulation or fusion-adhesion, example of the method is described in Japanese Patent Publication Open to Public Inspection, hereinafter referred to JP O.P.I., No. 5-265252.

Moreover, in a fixing method by a contact heating using a heating member such as a heating roller, the toner is required to have a releasing ability from the heating member, hereinafter referred to an anti-offset ability, and an anti-winding property of the image support to the heating member, hereinafter referred to an anti-winding ability.

It is necessary to be used a resin having a high molecular weight to obtain a toner excellent in the anti-offset ability and the anti-winding ability.

On the other hand, it is necessary to be used a high molecular weight as the resin constituting the toner particle to obtain a high adhesiveness of the toner to the image support or image receiving paper.

Therefore, it is preferable, for obtaining a toner excellent in the anti-offset ability and the anti-winding ability while maintaining the adhesiveness to the image support, that the toner particle contains a low molecular weight resin having a peak at a low molecular weight region of the molecular weight distribution and a high molecular weight resin having a peak at a high molecular weight region of the molecular weight distribution, namely the molecular weight distribution has two peaks.

(1) When the toner particle comprising a low molecular weight resin and a high molecular weight resin is produced by associating a resin particle with a colorant particle, a resin particle comprising the low molecular weight resin, a resin particle comprising the high molecular weight resin and the colorant particle have to be associated, coagulated and fusion adhered, in an aqueous medium.

However, the individual toner particles of the toner obtained by such the method tend to be different from each other in the molecular weight of the resin component or the composition of the resins, for example, composition ratio of the low molecular weight resin to the high molecular weight resin. Therefore, the improvement of the anti-offset ability and the anti-winding ability cannot be sufficiently obtained by the introduction of the high molecular weight resin.

(2) JP O.P.I. No. 9-265210 describes a toner production process comprising the step for preparing a combined particle containing a resin component having two peaks in the molecular weight distribution and a colorant (a colorant-containing composite resin particle) formed by twice repeating an emulsion polymerization of an ethylenic unsaturated monomer, and the step for associating (coagulating and fusion-adhering) thus obtained colorant-containing composite resin particles.

The difference of the molecular weight or the composition of the resin between the individual resin particles can be reduced in some degree by such the method since the composite resin particles (resin particles having two peaks in the molecular weight distribution) are associated.

However, the following problems are raised in the toner produced by the method described in the foregoing publication since the polymerization of the monomer is performed in the presence of the colorant.

(a) The composite resin particle (the colorant-containing composite resin particle) having the expected molecular weight cannot be obtained because the polymerization reaction of the monomer is inhibited by the presence of the colorant in the polymerization system. Such the toner tends to cause the stain in the fixing device or on the image since which is occurred by the resin component having a molecular weight of not reached to the expected value (a resin component having a low fusion viscosity).

(b) The monomer and an oligomer thereof are remained in the toner as a result of inhibition of polymerization by the colorant, and bad smell is given out some times in the course of image formation using the toner.

(c) The surface property of individual particles is varied from each other as a result of the inhibition of the polymerization reaction so that uniform polymerization is not performed. Accordingly, the distribution of the charged amount is made broad and the sharpness of the image formed by the toner is degraded some times.

According to the foregoing situation, the inventors have proposed a toner obtained by salt-out/fusion-adherence of the composite resin particle with the colorant particle and a producing method thereof, cf. JP O.P.I. No. 11-95889.

The toner described in this publication is excellent in the uniformity of the composition, the molecular weight and the surface property of each toner particles, and the anti-offset ability and the anti-winding ability can be improved while maintaining the adhesiveness (fixing ability) and a visual image having a high sharpness can be formed for a long period of time by the use of such the toner.

Introduction of a releasing agent into the toner particle is considered to further improve the anti-offset ability of the toner. Moreover, introduction of crystalline polyester as a fixing ability improving agent into the toner particle is considered to further improve the anti-offset ability of the toner.

To introduce the releasing agent and/or the crystalline polyester, a method in which an emulsion comprising a particle of the releasing agent and/or the crystalline polyester dispersed in water is added at the salting-out/fusion-adhering process for salting-out/fusion-adhering together with the composite resin particle and the colorant particle.

However, it has been experimentally confirmed by the inventors that the toner particle produced by the salt-out/fusion-adherence of the resin particles, the colorant particles and the particles of the releasing agent and/or the crystalline polyester is insufficient in the crush resistivity.

It is considered as the reason of the above fact that a continuous phase of the releasing agent and/or the crystalline polyester (a relatively large domain which functions as a stating point of the crush) exists at the interface of the resin particle.

As a result of that, a risk of occurrence of filming, fogging or toner spending is raised when the toner produced by the association of the releasing agent particle and/or the crystalline polyester particle is used to image formation for a long period of time Recently, development of a toner is strongly demanded which is able to be fixed at a temperature lower than that of an usual toner according to requirements of miniaturization and reduction of electric consumption of a copy machine. Therefore, it is preferred that the toner has a wide range (a fixing performable temperature range) from the lowest temperature at which the fixing can be performed (the lowest fixing temperature) to the highest temperature at which the offset phenomenon is not occurred.

However, it has been experimentally found by the inventors that the toner prepared by the salt-out/fusion-adherence of the resin particle, the colorant particle and the releasing agent particle and/or the crystalline polyester particle has not the sufficiently wide fixing performable range.

SUMMARY OF THE INVENTION

The first object of the invention is to provide an associated type toner and a producing method thereof, which is constituted by a resin having a designated molecular weight distribution and the variation of the composition, molecular weight and the surface property between the individual particles is small.

The second object of the invention is to provide an associated type toner and a producing method thereof, which has a high anti-offset ability and a high anti-winding ability while maintaining a sufficient adhesiveness to the image support.

The third object of the invention is to provide an associated type toner and a producing method thereof, which does not give off a bad smell in the process of image formation and the fixation by heat.

The fourth object of the invention is to provide an associated type toner and a producing method thereof, which is excellent in the charging property and capable of forming an image having a high sharpness.

The fifth object of the invention is to provide an associated type toner and a producing method thereof, which is excellent in the anti-crush property and does not form a fine powder causing filming, fogging and toner spending.

The sixth object of the invention is to provide an associated type toner and a producing method thereof, which has a wide fixing performable temperature range.

The seventh object of the invention is to provide an image forming method using the foregoing excellent associated type toner.

A toner production method a comprising (I) the step for forming a composite resin particle by a multi-step polymerization process, which contains a releasing agent or a crystalline polyester compound in a portion other than the outermost layer, and (II) the step for salting-out/fusion-adhering the composite resin particle with a colorant particle.

A toner production method comprising the step (I) for forming a composite resin particle by a two-step polymerization process, which has a central portion (core) comprising a high molecular weight resin having a peak or shoulder molecular weight within the range of from 100,000 to 1,000,000 and an outer layer (shell) comprising a low molecular weight resin having a peak or shoulder molecular weight within the range of from 1,000 to 50,000, and the central portion (core) contains a releasing agent or a crystalline polyester compound, and (II) the step for salting-out/fusion-adhering the composite resin particle with a colorant particle.

A toner production method comprising (I) the step for forming by a three-step polymerization process a composite resin particle which has a central portion (core) comprising a high molecular weight resin having a peak or shoulder molecular weight within the range of from 100,000 to 1,000,000, an interlayer comprising a resin having a peak or shoulder molecular weight within the range of from 25,000 to 150,000 and an outer layer (shell) comprising a low molecular weight resin having a peak or shoulder molecular weight within the range of from 1,000 to 50,000, and the interlayer contains a releasing agent or a crystalline polyester compound, and (II) the step for salting-out/fusion-adhering the composite resin particle with a colorant particle.

A toner production method comprising the step for forming a system by adding a resin particle to be a central portion of a combined particle into an aqueous solution of a surfactant and dispersing a monomer composition containing a releasing agent or a crystalline polyester compound in the solution, and the system is subjected to a polymerization treatment.

In an image formation method described above, the method comprises the step for fixing the image by a directly heating process, in which the foregoing toner is used for image formation.

DETAILED DESCRIPTION OF THE INVENTION

Figure 1:
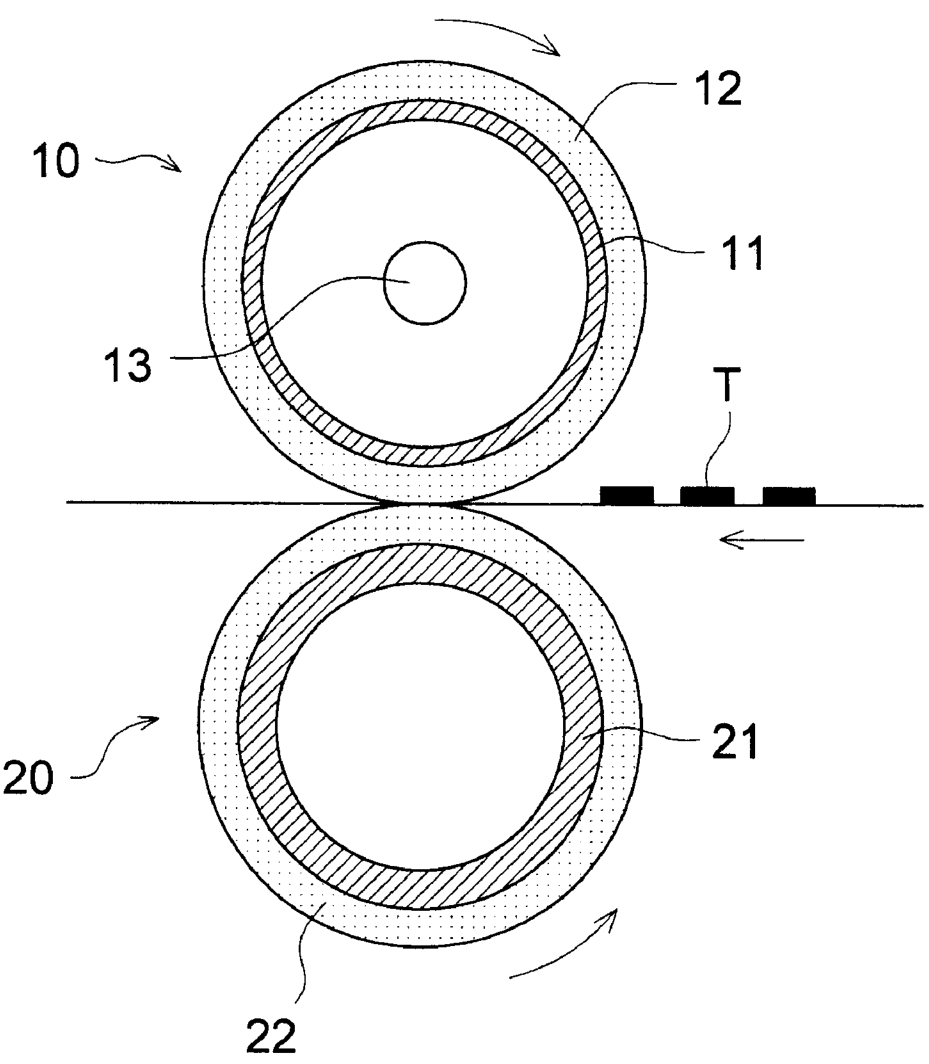
FIG. 1 is a cross-sectional view showing an example of a fixing unit employed in the present invention.

Other preferable embodiments of the invention are described.

1. A toner Produced by salt-out/fusion-adherence of a composite resin particle prepared by a poly-step polymerization process, and a colorant particle, and a mold-releasing agent is contained in a portion other than the outermost layer of the composite resin particle.

2. A toner produced by salt-out/fusion-adherence of a composite resin particle prepared by a two-step polymerization process and a colorant particle, in which the composite resin particle has a central portion (core) comprising a high molecular weight resin having a peak or shoulder molecular weight within the range of from 100,000 to 1,000,000 and an outer layer (shell) comprising a low molecular weight resin having a peak or shoulder molecular weight within the range of from 1,000 to 50,000, and the central portion (core) contains a releasing agent.

3. A toner produced by salt-out/fusion-adherence of a composite resin particle prepared by a three-step polymerization process and a colorant particle, in which the composite resin particle has a central portion (core) comprising a high molecular weight resin having a peak or shoulder molecular weight within the range of from 100,000 to 1,000,000, an interlayer comprising a resin having a peak or shoulder molecular weight within the range of from 25,000 to 150,000, and an outer layer (shell) comprising a low molecular weight resin having a peak or shoulder molecular weight within the range of from 1,000 to 50,000, and the interlayer contains a releasing agent.

4. A toner containing a resin, a releasing agent and a colorant, which has crushability index of from 0.1 to 0.8.

5. A toner production method a comprising (I) the step for forming a composite resin particle by a multi-step polymerization process, which contains a releasing agent in a portion other than the outermost layer, and (II) the step for salting-out/fusion-adhering the composite resin particle with a colorant particle.

6. A toner production method comprising the step (I) for forming a composite resin particle by a two-step polymerization process, which has a central portion (core) comprising a high molecular weight resin having a peak or shoulder molecular weight within the range of from 100,000 to 1,000,000 and an outer layer (shell) comprising a low molecular weight resin having a peak or shoulder molecular weight within the range of from 1,000 to 50,000, and the central portion (core) contains a releasing agent, and (II) the step for salting-out/fusion-adhering the composite resin particle with a colorant particle.

7. A toner production method comprising (I) the step for forming by a three-step polymerization process a composite resin particle which has a central portion (core) comprising a high molecular weight resin having a peak or shoulder molecular weight within the range of from 100,000 to 1,000,000, an interlayer comprising a resin having a peak or shoulder molecular weight within the range of from 25,000 to 150,000 and an outer layer (shell) comprising a low molecular weight resin having a peak or shoulder molecular weight within the range of from 1,000 to 50,000, and the interlayer contains a releasing agent, and (II) the step for salting-out/fusion-adhering the composite resin particle with a colorant particle.

8. A toner production method comprising the step for forming a system by adding a resin particle to be a central portion of a combined particle into an aqueous solution of a surfactant and dispersing a monomer composition containing a releasing agent in the solution, and the system is subjected to a polymerization treatment.

9. An image formation method comprising the step for fixing the image by a directly heating process, in which the foregoing toner is used for image formation.

10. A toner produced by salt-out/fusion adherence of a composite resin particle which is obtained by multi-step polymerization process and a colorant particle in which a crystalline polyester is contained in a portion of the composite resin particle other than the outermost layer.

11. A toner produced by salt-out/fusion-adherence of a composite resin particle prepared by a two-step polymerization process and a colorant particle, in which the composite resin particle has a central portion (core) comprising a high molecular weight resin having a peak or shoulder molecular weight within the range of from 100,000 to 1,000,000 and an outer layer (shell) comprising a low molecular weight resin having a peak or shoulder molecular weight within the range of from 1,000 to 50,000, and the central portion (core) contains a crystalline polyester.

12. A toner produced by salt-out/fusion-adherence of a composite resin particle prepared by a three-step polymerization process and a colorant particle, in which the composite resin particle has a central portion (core) comprising a high molecular weight resin having a peak or shoulder molecular weight within the range of from 100,000 to 1,000,000, an inter layer comprising a resin having a peak or shoulder molecular weight within the range of from 25,000 to 150,000, and an outer layer (shell) comprising a low molecular weight resin having a peak or shoulder molecular weight within the range of from 1,000 to 50,000, and the interlayer contains crystalline polyester.

13. A toner containing a resin, crystalline polyester and a colorant, and having crushability index of from 0.1 to 0.8.

14. A toner production method a comprising (I) the step of forming a composite resin particle containing a crystalline polyester in a portion of the particle other than the outermost layer by a multi-step polymerization process, and (II) the step for salting-out/fusion-adhering the composite resin particle with a colorant particle.

15. A toner production method comprising the step (I) for forming a composite resin particle by a two-step polymerization process, which has a central portion (core) comprising a high molecular weight resin having a peak or shoulder molecular weight within the range of from 100,000 to 1,000,000 and an outer layer (shell) comprising a low molecular weight resin having a peak or shoulder molecular weight within the range of from 1,000 to 50,000, and the central portion (core) contains a crystalline polyester, and (II) the step for salting-out/fusion-adhering the composite resin particle with a colorant particle.

16. A toner production method comprising (I) the step for forming by a three-step polymerization process a composite resin particle which has a central portion (core) comprising a high molecular weight resin having a peak or shoulder molecular weight within the range of from 100,000 to 1,000,000, an inter layer comprising a resin having a peak or shoulder molecular weight within the range of from 25,000 to 150,000, and an outer layer (shell) comprising a low molecular weight resin having a peak or shoulder molecular weight within the range of from 1,000 to 50,000, and the interlayer contains a crystalline polyester, and a colorant particle, and (II) the step for salting-out/fusion-adhering the composite resin particle with a colorant particle.

17. A toner production method comprising the step for forming a system by adding a resin particle to be a central portion of a combined particle into an aqueous solution of a surfactant and dispersing a monomer composition containing crystalline polyester in the solution, and the system is subjected to a polymerization treatment.

18. An image formation method comprising a step for fixing the image by a directly heating process, in which the foregoing toner is used for image formation.

(1) The "composite resin particle" constituting the toner according to the invention is a resin particle having a multi-layer structure which is constituted by a core resin particle covered by one or more resins covering layers each different from the resin of the core particle in the molecular weight and/or the composition thereof.

The "central portion (core)" is a "core particle" constituting the composite resin particle.

The "outer layer (shell)" is the outermost layer among the "one or more covering layers" constituting the composite resin particle.

The "interlayer" is a covering layer provided between the central portion (core) and the outer layer (shell).

The molecular weight distribution of the composite resin particle is a monodisperse and the combined particle resin particle usually has a molecular weight gradient from the central portion (core) to the outer layer (shell).

(2) In the invention, a "multi-step polymerization method" to obtain the combined resin article is a method in which a monomer (n+1) is polymerized (n+1 step) in the presence of a resin particle (n) prepared by polymerizing a monomer (n) to form a covering layer (n+1) comprising a polymer of the monomer (n+1) which is different from the resin of the resin particle (n) in the dispersed situation and the composition, on the resin particle (n).

When the resin particle (n) is the core particle (n=1), the polymerization is the two-step polymerization, and when the resin particle (n) is a composite resin particle (n≧2), the polymerization is the three or more multi-step polymerization.

(3) In the invention, the "salt-out/fusion adherence" means that salting-out (coagulation) of the particles and fusion-adhering (disappearance of the interface of the particles) are simultaneously occurred.

To simultaneously perform the salt-out and the fusion-adherence, it is necessary to coagulate the particles (the composite resin particles and colorant particles) under a temperature condition of not higher than the glass transition temperature Tg of the resin constituting the composite resin particle.

(4) The "crushability index" is an index representing the crushability of the toner particle, which is concretely determined by the following procedure.

Procedure

Into a 2 liter polyethylene pot, 30 g of a toner sample, 100 g of glass beads GB503M, manufactured by Toshiba-Barotini Co., Ltd., are charged, and stirred for 60 seconds by a tabular mixer. Then the glass beads are separated by a sieve of 300 meshes. Thereafter, the number ration in percent of fine particles having a diameter of from 2 μm to 4 μm in the whole particles is measured and the index is determined by the following equation.

$$\text{Crushability index}=(N-N_0)/60$$

In the equation, N is the number ratio in percent of the fine particles having a diameter of from 2 μm to 4 μm after the stirring, and $N_0$ is the number ratio in percent of the fine particles having a diameter of from 2 μm to 4 μm before the stirring.

The "number ratio in percent of the fine particles" is measured by Coultar Multisizer. In concrete, Coulter Multisizer connected with a personal computer through an interface, manufactured by Nikkaki Co., Ltd., for outputting the particle diameter distribution is used. An aperture of 100 μm is used in the Coulter Multisizer, and the volume distribution of toner particles each having a diameter of 2 μm or more, for example from 2 μm to 40 μm, is measured and the index is calculated.

Toner having a desired crushability index can be obtained by, for example, controlling molecular weight of the resin employed in the outermost layer of the composite rein particles, and controlling temperature of fusion and stirring condition during the coagulation process.

(1) In the composite resin particle prepared by the multi-step polymerization includes a plurality of resins each different from other in the composition and/or the molecular weight. Consequently, the scattering of the composition, molecular weight and surface property of individual particles is extremely small in the toner produced by the salt-out/fusion-adherence of the composite resin particle with the colorant particle.

The anti-offset ability and the anti-winding ability of the toner can be improved while maintaining the high adhesiveness (high fixing strength) to the image supporting member in the image forming method including a fixing process by direct heating step, and an image having a suitable glossiness can be obtained by the use of such the toner having the uniformity of the composition, molecular weight and surface property with respect to each of the individual particles.

(2) In the invention, the composite resin particle is formed in the presence of no colorant, and a dispersion of the colorant particle is added to the dispersion of the composite resin particle, and the composite resin particles and the colorant particles are salted-out/fusion-adhered to prepare the toner.

The polymerization reaction for preparing the composite resin particle since the preparation of the resin particle is performed in the system without the presence of the colorant.

Consequently, the excellent anti-offset ability of the toner is not degraded by the toner according to the invention, and the stain of the fixing means or the image caused by accumulation of the toner is not occurred.

The monomer or oligomer is not remained in the toner particle since the polymerization reaction for forming the composite resin particle is sufficiently performed, and the bad smell is not given off in the heat fixing process in the course of the image formation using the toner according to the invention.

The surfaces of the toner particles are uniform and the charging amount distribution is sharp, therefore, an image excellent in the sharpness can be formed for a long period of time.

(3) According to the multi-step polymerization method, the control of the molecular weight distribution of the resin component has freeness and the molecular weight distribution can be easily controlled.

(4) In the toner particle obtained by the salt-out/fusion-adherence of the composite resin particle containing the releasing agent and/or the crystalline polyester, one or more domains of the releasing agent and/or the crystalline polyester exist at the submicron region corresponding to the size of the composite resin particle.

Accordingly, in the toner particle constituting the toner according to the invention, a sufficient amount of the releasing agent and/or the crystalline polyester are contained, and the existing amount of the releasing agent and/or the crystalline polyester is not scattered between the individual particles.

The releasing agent employed in the invention is an organic crystalline compound having a melting point of from 50 to 130° C. and melt viscosity of not more than 200 cPs at 160° C.

(5) The outermost layer of the composite resin particle to be subjected to the salting-out/fusion-adhering treatment contains no releasing agent and no crystalline polyester and comprises a low molecular weight resin. Therefore, the composite resin particles are strongly adhered with together and the fusion-adhered particle (toner particle) having a high anti-crush strength.

<Toner of the Invention>

The toner according to the invention is a toner obtained by salt-out/fusion-adherence of the composite resin particle prepared by the multi-step polymerization and the colorant particle, which contains the releasing agent in a portion other than the outermost layer of the composite resin particle (the central portion or interlayer).

The toner of the invention according to another embodiment is a toner obtained by salt-out/fusion-adherence of the composite resin particle prepared by the multi-step polymerization with the colorant particle, which contains the crystalline polyester in a portion other than the outermost layer of the composite resin particle (the central portion or interlayer).

<Resin Particle>

The composite resin particle for obtaining the toner according to the invention, the followings can be described, (1) a combined rein particle having the central portion (core) comprising the high molecular weight resin and the outer layer (shell) comprising the low molecular weight resin, and the central portion (core) contains the releasing agent, (2) a combined rein particle having the central portion (core) comprising the high molecular weight resin, one or more of interlayers and the outer layer (shell) comprising the medium molecular weight resin, and the central portion (core) contains the releasing agent, (3) a combined rein particle having the central portion (core) comprising a high molecular weight resin and the outer layer (shell) comprising the low molecular weight resin, and the central portion (core) contains the crystalline polyester.

(4) a combined rein particle having the central portion (core) comprising the high molecular weight resin, one or more of interlayers and the outer layer (shell) comprising the medium molecular weight resin, and the central portion (core) contains the crystalline polyester.

The high molecular weight resin and the low molecular weight resin can be introduced in the toner of the invention by salt-out/fusion-adherence of the foregoing composite resin particle.

The "high molecular weight resin" constituting the central portion (core) of the composite resin particle is a resin having a peak or a shoulder within the range of from 100,000 to 1,000,000, preferably from 120,000 to 500,000, in the molecular weight distribution measured by GPC.

A sufficient internal coagulating force (the anti-offset ability at a high temperature) can be given to the toner by introducing such the high molecular weight resin.

The "low molecular weight resin" constituting the outer layer (shell) of the composite resin particle is a resin having a peak or a shoulder within the range of from 1,000 to 50,000, preferably from 3,000 to 20,000, in the molecular weight distribution measured by GPC.

An excellent fixing ability (the adhesive force to the image support member) can be given to the toner by introducing such the high molecular weight resin.

The "medium molecular weight resin" constituting the interlayer of the composite resin particle is a resin having a peak or a shoulder within the range of from 25,000 to 150,000, and the peak molecular weight of the medium molecular weight constituting the interlayer have to be between the peak molecular weight of the high molecular weight resin constituting the central portion (core) of the composite resin particle and the peak molecular weight of the low molecular weight resin constituting the outer layer (shell) of the composite resin particle. Thus a gradient of the molecular weight is formed between the central portion (core) and the outer layer (shell) of the composite resin particle.

Molecular weight of the resin composing toner is styrene converted molecular weight measured by gel permeation chromatography (GPC) Herein, the method for measuring the molecular weight of resins, employing GPC, is as follows. Added to 1 cc of THF is a measured sample in an amount of 0.5 to 5.0 mg (specifically, 1 mg), and is sufficiently dissolved at room temperature while stirring employing a magnetic stirrer and the like. Subsequently, after filtering the resulting solution employing a membrane filter having a pore size of 0.48 to 0.50 $\mu$m, the filtrate is injected in a GPC.

Measurement conditions of GPC are described below. A column is stabilized at 40° C., and THF is flowed at a rate of 1 cc per minute. Then measurement is carried out by injecting approximately 100 $\mu$l of said sample at a concentration of 1 mg/cc. It is preferable that commercially available polystyrene gel columns are combined and used. For example, it is possible to cite combinations of Shodex GPC KF-801, 802, 803, 804, 805, 806, and 807, produced by Showa Denko Co., combinations of TSKgel G1000H, G2000H, G3000H, G4000H, G5000H, G6000H, G7000H, TSK guard column, and the like. Further, as a detector, a refractive index detector (IR detector) or a UW detector is preferably employed. When the molecular weight of samples is measured, the molecular weight distribution of said sample is calculated employing a calibration curve which is prepared employing monodispersed polystyrene as standard particles. Approximately ten polystyrenes samples are preferably employed for determining said calibration curve.

Of polymerizable monomers which are employed to prepare resin particles, radical polymerizable monomers are essential components, and if desired, crosslinking agents may be employed. Further, at least one of said radical polymerizable monomers having an acidic group or radical polymerizable monomers having a basic group, described below, is preferably incorporated.

(1) Radical Polymerizable Monomers

Radical polymerizable monomers are not particularly limited. It is possible to employ conventional radical polymerizable monomers known in the art. Further, they may be employed in combination of two or more types so as to satisfy desired properties.

Specifically, employed may be aromatic vinyl monomers, acrylic acid ester based monomers, methacrylic acid ester based monomers, vinyl ester based monomers, vinyl ether based monomers, monoolefin based monomers, diolefin based monomers, halogenated olefin monomers, and the like.

Listed as aromatic vinyl monomers, for example, are styrene based monomers and derivatives thereof such as styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrne, p-n-nonylstyrene, p-n-decylstyrene, p-n-dodecylstyrene, 2,4-dimethylstyrne, 3,4-dichlorostyrene, and the like.

Listed as acrylic acid ester bases monomers and methacrylic acid ester monomers are methyl acrylate, ethyl acrylate, butyl acrylate, 2-ethylhexyl acrylate, cyclohexyl acrylate, phenyl acrylate, methyl methacrylate, ethyl methacrylate, butyl methacrylate, hexyl methacrylate, 2-ethylhexyl methacrylate, ethyl β-hydroxyacrylate, propyl γ-aminoacrylate, stearyl methacrylate, dimethyl aminoethyl methacrylate, diethyl aminoethyl methacrylate, and the like.

Listed as vinyl ester based monomers are vinyl acetate, vinyl propionate, vinyl benzoate, and the like.

Listed as vinyl ether based monomers are vinyl methyl ether, vinyl ethyl ether, vinyl isobutyl ether, vinyl phenyl ether, and the like.

Listed as monoolefin based monomers are ethylene, propylene, isobutylene, 1-butene, 1-pentene, 4-methyl-1-pentene, and the like.

Listed as diolefin based monomers are butadiene, isoprene, chloroprene, and the like.

Listed as halogenated olefin based monomers are vinyl chloride, vinylidene chloride, vinyl bromide, and the like.

(2) Crosslinking Agents

In order to improve the desired properties of toner, added as crosslinking agents may be radical polymerizable crosslinking agents. Listed as radical polymerizable agents are those having at least two unsaturated bonds such as divinylbenzene, divinylnaphthalene, divinyl ether, diethylene glycol methacrylate, ethylene glycol dimethacrylate, polyethylene glycol dimethacrylate, phthalic acid diallyl, and the like.

Content ratio of the radical polymerizable crosslinking agent with respect to the monomer (or mixture of monomers) is preferably 0.1 to 10 weight %.

(3) Radical Polymerizable Monomers Having an Acidic Group

Employed as radical polymerizable monomers having an acidic group are monomers having a carboxyl group such as acrylic acid, methacrylic acid, fumaric acid, maleic acid, itaconic acid, cinnamic acid, monobutyl maleate, monooctyl maleate and the like, and monomers having sulfonic acid such as styrenesulfonic acid, allylsulfosuccinic acid, octyl allylsulfosuccinate, and the like.

These may be in the form of salts of alkali metals such as sodium or potassium, or salts of alkali earth metals such as calcium and the like.

Content ratio of the radical polymerizable monomer having acidic group with respect to the monomer (or mixture of monomers) is preferably 0.1 to 20 weight %, and more preferably 0.1 to 15 weight %.

Listed as radical polymerizable monomers having a basic group are amine based compounds such as primary amine, secondary amine, tertiary amine etc., which include dimethyl aminoethyl acrylate, dimethyl aminoethyl methacrylate, diethyl aminoethyl acrylate, diethyl aminoethyl methacrylate, and quaternary ammonium salts of said four compounds; 3-dimethylaminophenyl acrylate, 2-hydroxy-3-methacryloxypropyltrimethylammonium salt; acrylamide, N-butylacrylamide, N,N-dibutylacrylamide, piperidylacrylamide, methacrylamide, N-butylmethacrylamide, N-octadecylacrylamide; vinylpyridine; vinylpyrrolidone; vinyl N-methylpyridinium chloride, vinyl N-ethylpyridinium chloride, N,N-diallylmethylammonium chloride, N,N-diallylethylammonium chloride; and the like.

Content ratio of the radical polymerizable monomer having basic group with respect to the monomer (or mixture of monomers) is preferably 0.1 to 20 weight %, and more preferably 0.1 to 15 weight %.

Chain Transfer Agents

For the purpose of regulating the molecular weight of resin particles, it is possible to employ commonly used chain transfer agents.

Said chain transfer agents are not particularly limited, and for example, employed are mercaptans such as octylmercaptan, dodecylmercaptan, tert-dodecylmercaptan, and the like, carbon tetrabromide, styrene dimer, and the like.

Polymerization Initiators

Radical polymerization initiators may be suitably employed in the present invention, as long as they are water-soluble. For example, listed are persulfate salts (potassium persulfate, ammonium persulfate, and the like), azo based compounds (4,4'-azobis-4-cyanovaleric acid and salts thereof, 2,2'-azobis(2-amidinopropane) salts, and the like), peroxides, and the like.

Further, if desired, it is possible to employ said radical polymerization initiators as redox based initiators by combining them with reducing agents. By employing said redox based initiators, it is possible to increase polymerization activity and decrease polymerization temperature so that a decrease in polymerization time is expected.

It is possible to select any polymerization temperature, as long as it is higher than the lowest radical formation temperature of said polymerization initiator. For example, the temperature range of 50 to 80° C. is employed. However, by employing a combination of polymerization initiators such as hydrogen peroxide-reducing agent (ascorbic acid and the like), which is capable of initiating the polymerization at room temperature, it is possible to carry out polymerization at at least room temperature.

Surface Active Agents

In order to perform polymerization employing the aforementioned radical polymerizable monomers, it is required to conduct oil droplet dispersion in a water based medium employing surface active agents. Surface active agents, which are employed for said dispersion, are not particularly limited, and it is possible to cite ionic surface active agents described below as suitable ones.

Listed as ionic surface active agents are sulfonic acid salts (sodium dodecylbenzenesulfonate, sodium aryl alkyl polyethersulfonate, sodium 3,3-disulfondiphenylurea-4,4-diazo-bis-amino-8-naphthol-6-sulfonate, sodium ortho-caroxybenzene-azo-dimethylaniline-2,2,5,5-tetramethyl-triphenylmethane-4,4-diazi-bis-β-naphthol-6-sulfonate, and the like), sulfuric acid ester salts (sodium dodecylsulfonate, sodium tetradecylsulfonate, sodium pentadecylsulfonate, sodium octylsulfonate, and the like), fatty acid salts (sodium oleate, sodium laureate, sodium caprate, sodium caprylate, sodium caproate, potassium stearate, potassium oleate, and the like).

Further, it is possible to employ nonionic surface active agents. Specifically, it is possible to cite polyethylene oxide, polypropylene oxide, a combination of polypropylene oxide and polyethylene oxide, alkylphenol polyethylene oxide, esters of polyethylene glycol with higher fatty acids, esters of polypropylene oxide with higher fatty acids, sorbitan esters, and the like.

The average particle diameter of composite particles is preferably from 10 to 1,000 nm, more preferably from 30 to 300 nm in terms of weight average diameter determined employing an electrophoresis light scattering photometer "ELS-800" (produced by Ohtsuka Denshi Co.).

Glass transition temperature (Tg) of the resin component composing the toner (resin introduced by composite particles) is preferably from 48 to 74° C., and more preferably from 52 to 65° C.

The softening point of the resin is preferably from 95 to 140° C.

The glass transition temperature (Tg) is a temperature measured by DSC, that is, an intersection point of the base line and gradient of endothermic peak. Practically a differential scanning calorimeter is employed. Temperature of the sample is raised to 100° C. and is kept at the same temperature for 3 minutes and then is decreased to room temperature at the rate 10° C./minute. Then temperature of the sample is raised at the rate 10° C./minute. Transition temperature is obtained as an intersection point of the extension of the base line under glass transition point and a tangential line showing maximum inclination between rising up point to vertex of the peak.

Cited as the specific measurement apparatus can be DSC-7 manufactured by Perkin-Elmer Corp.

The softening point of the amorphous polymer denotes a value measured by employing capillary type flow tester. To be concrete, the softening point is temperature corresponding to ½ height from flow starting point to flow end point when 1 g of the sample is flow through a die having pore of diameter 1 mm and 1 mm long, at a condition of load 20 $kg/cm^2$ with raising temperature speed of 6° C./min employing capillary type flow tester CFT-500 (manufactured by Shimadzu Corp.).

<Releasing Agents>

Toner employed in the invention comprises aggregation toner particles obtained by salting out/fusing composite resin particles containing a releasing agent in a region other than the outermost layer (i. e., core or inter layer) and colored particles.

Releasing agents includes those can be dispersed in water. Practically olefin series wax such as polypropylene, polyethylene etc., denatured material of these olefin series wax, natural wax such as carnauba wax, rice wax etc., amide series wax such as fatty acid bisamide and so on. Among these the preferable examples are crystalline releasing agent having a melting point. The preferable melting point is from 50 to 130° C., and more preferably 60 to 120° C.

Preferable examples of the releasing agent include crystalline ester compounds (which may be called as Specified Ester Compounds in the Specification) represented by General Formula (1), described below.

$$R^1\text{—}(OCO\text{—}R^2)_n \qquad \text{General Formula (1)}$$

wherein $R^1$ and $R^2$ each represent a hydrocarbon group having from 1 to 40 carbon atoms which may have a substituent, and n represents an integer of 1 to 4.

<Specified Ester Compounds>

In General Formula (1), which represents specified ester compounds, $R^1$ and $R^2$ each represent a hydrocarbon group which may have a substituent.

Said hydrocarbon group $R^1$ generally has from 1 to 40 carbon atoms, preferably has from 1 to 20 carbon atoms, and more preferably has from 2 to 5 carbon atoms.

Said hydrocarbon group $R^2$ generally has from 1 to 40 carbon atoms, preferably has from 16 to 30 carbon atoms, and more preferably has from 18 to 26 carbon atoms.

Further, in General Formula (1), n is generally an integer of 1 to 4, is preferably an integer of 2 to 4, is more preferably an integer of 3 and 4, and is most preferably the integer of 4.

It is possible to suitably synthesize said specified ester compounds employing dehydration condensation reaction between alcohols and carboxylic acids.

Listed as specific examples of specified ester compounds may be those represented by formulas 1) through 22) shown below.

1)

$CH_3\text{—}(CH_2)_{12}\text{—}COO\text{—}(CH_2)_{17}\text{—}CH_3$

2)

$CH_3\text{—}(CH_2)_{18}\text{—}COO\text{—}(CH_2)_{17}\text{—}CH_3$

3)

$CH_3\text{—}(CH_2)_{20}\text{—}COO\text{—}(CH_2)_{21}\text{—}CH_3$

4)

$CH_3\text{—}(CH_2)_{14}\text{—}COO\text{—}(CH_2)_{19}\text{—}CH_3$

5)

$CH_3\text{—}(CH_2)_{20}\text{—}COO\text{—}(CH_2)_6\text{—}O\text{—}CO\text{—}(CH_2)_{20}\text{—}CH_3$

6)

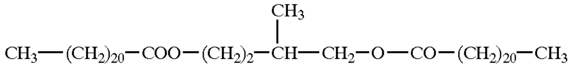

7)

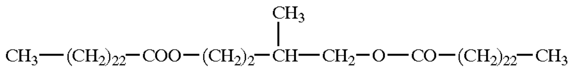

-continued

8)

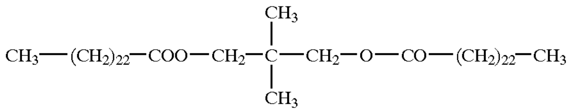

9)

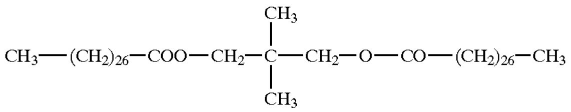

10)

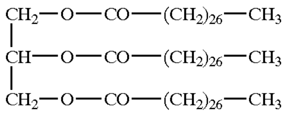

11)

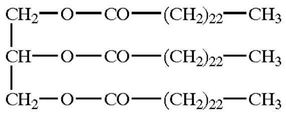

12)

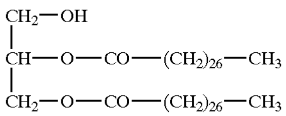

13)

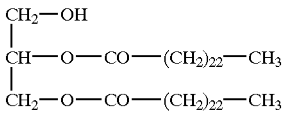

14)

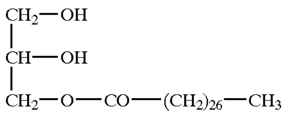

15)

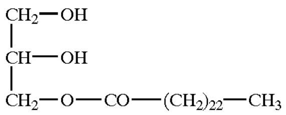

16)

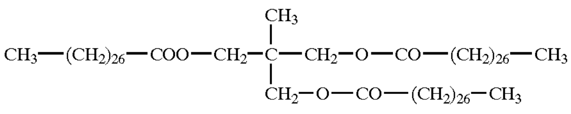

17)

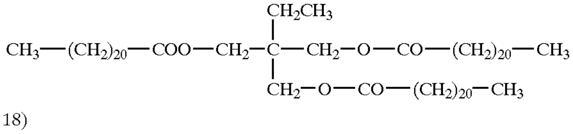

18)

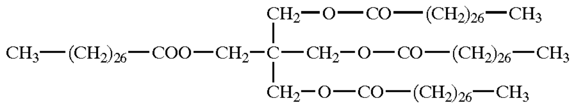

-continued

19)

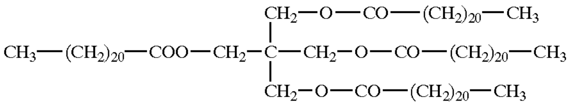

20)

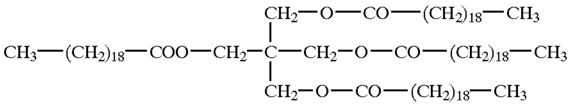

21)

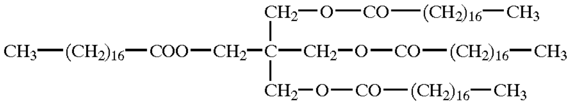

22)

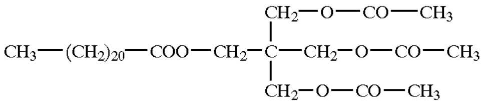

Preferable examples are those having a melting point of 50 to 130° C., and more preferably are those having a melting point of 60 to 120° C.

<Content Ratio of Releasing agents>

The content ratio of releasing agents in the toner is commonly 1 to 30 percent by weight, is preferably 2 to 20 percent by weight, and is more preferably 3 to 15 percent by weight.

Area Containing Releasing Agent in Composite Resin Particle

The releasing agent in a composite resin particle of the toner particles is incorporated in a region other than outermost layer, that is, center region or inter layer.

Outermost layer of the resin particle dose not contain the releasing agent which reduces adhesion strength between particles. Therefore fused toner particles having high resistant to crushing can be obtained by the composite particles since they adhere closely each other during the salting out/fusion process.

The composite resin particles contain the releasing agent and the releasing agent does not exposed from the composite resin particles. The composite resin particles have preferably a structure in which a core particle and/or an inter layer on the core particles are covered with a resin layer. In this instance, the releasing agent is allowed to expose from the core particles or the inter layer.

Population of the composite particles according to the invention is preferably not less than 60% by number among the toner particles.

<Crystalline Polyester>

The toner comprises coagulated toner particles which are obtained through coagulating resin particles containing the crystalline polyester in a region other than outermost layer, that is, center region or inter layer and colorant particles by salting out/fusion process.

The crystalline polyester incorporated in the resin particles is a compound giving a good fixing ability (that is adhesiveness to an image forming material) to the toner which is obtained by fusing the resin particles. The crystalline polyester makes the viscoelasticy of toner during fixation and improves the fixing ability at low temperature.

<Property of Crystalline Polyester>

The melting point of crystalline polyester compounds described above is preferably between 50 and 130° C., and is more preferably between 60 and 120° C.

When crystalline polyester compounds, having a melting point in the range of 50 to 130° C., are employed, it is possible to lower the entire melt viscosity of the obtained toner, and it is also possible to attempt the enhancement of adhesion to paper and the like. In addition, even though said crystalline polyester compounds are present, the elastic modulus on the high temperature side is maintained in the preferred range. Thus excellent offset resistant properties are exhibited. When the melting point of crystalline polyester compounds is less than 50° C., fixability is improved. However, commercially unviable problems occur due to the degradation of storage stability. On the other hand, when the melting point exceeds 130° C., contribution to the enhancement of fixability decreases due to an increase in the melt initiation temperature. Thus reduced effect for the improvement of fixability is exhibited.

The melting point of crystalline polyester compounds, as described herein, means the value measured by a differential scanning calorimeter (DSC). Specifically, when temperature increases at a rate of 10° C./minute from 0 to 200° C., the temperature, which shows the maximum peak of measured endothermic peaks, is designated as the melting point. Cited as a specific measurement apparatus may be DSC-7 manufactured by Perkin-Elmer Corp.

The number average molecular weight of crystalline polyester compounds is preferably between 1,500 and 15,000, and is more preferably between 2,000 and 10,000. In the toner obtained employing crystalline polyester compounds having a number average molecular weight of 1,500 to 15,000, compatibility with amorphous polymers which are employed to realize a total decrease in the melt viscosity is improved in a molten state, and thus the fixability in the lower temperature range is enhanced. When said number average molecular weight is less than 1,500, the melt viscosity of said crystalline polyester compounds becomes excessively low, and on the contrary, the compatibility state tends to be non-uniform. As a result, it becomes difficult to enhance the desired fixability. On the other hand, when the number average molecular weight exceeds 15,000, it takes extra time to melt the crystalline polyester compounds, and the compatibility state also becomes non-uniform. Thus, effects to enhance the fixability are insufficient. Condition Model of machine employed: LC-6 A (manufactured by Shimadzu Corp.)

Column: Ultrastyragel Plus

Analysis temperature: 60° C.

Solvent: m-cresol/chlorobenzene 3/1 (volume ratio)

Calibration curve: Standard polystyrene calibration curve

It is preferable that melt viscosity of a crystalline polyester compound (viscosity at melting point plus 20 degrees) is less than 300 dPa·s and more preferably less than 250 dPa·s.

When a crystalline polyester compound having melt viscosity of less than 300 dPa·s is employed, melt viscosity as a whole including the amorphous polymer can be lowered, and fixing ability improves in provided toner.

Improvement effect of fixing ability deteriorates because total melt viscosity becomes high when the melt viscosity exceeds 300 dPa·s.

Melt viscosity of a crystalline polyester compound (viscosity by melting point plus 20 degrees) means a value measured by a cone plate viscometer.

Peak molecular weight of the crystalline polyester compound measured by GPC is with 6,000–50,000.

Crystalline polyester composing the toner in accordance with the present invention generally exhibits an endothermic peak (P1) in the range of 50 to 130° C. during the first temperature rising stage, as measured with a DSC, and more preferably exhibits the same in the range of 60 to 120° C.

Further, said crystalline polyester compounds exhibit an exothermic peak (P2) in the range of 30 to 110° C. during the first cooling process, employing a DSC, and preferably exhibit the same in the range of 40 and 100° C.

Herein, the relationship of $P1 \geqq P2$ is held between the endothermic peak (P1) and the exothermic peak (P2). The temperature difference (P1−P2) is not particularly limited, but is preferably not more than 50° C.

By incorporating the crystalline polyester compounds having thermal properties as described above as the resinous component into toner, as can clearly be seen from the results of examples described below, it is possible to exhibit excellent offset resistant effects (a wider fixable temperature range) as well as excellent fixability (high fixing ratio).

It is preferable that the amorphous polymers and the crystalline polyester compounds preferably exist in a state independent of each other. Namely, said crystalline polyester compounds abruptly melt and the resulting molten state exhibits an action to dissolve the amorphous polymers. As a result, it is possible to decrease the entire melt viscosity of the toner, and thus it is possible to enhance the fixability. Further, by allowing both to be present independent of each other, it becomes possible to minimize the decrease in the elastic modulus. As result, the offset resistance is not degraded.

When the endothermic peak (P1) is less than 50° C., fixability is enhanced due to the low melting temperature, while offset resistant properties as well as storage stability are degraded.

Further, when the endothermic peak (P1) exceeds 130° C., a compatibility temperature with the amorphous polymer increases due to the high melting temperature. As a result, it is impossible to realize the enhancement of the fixability.

When an exothermic peak (P2), showing a recrystallization state, is present in the range of less than 30° C., it is impossible to carry our recrystallization without cooling to a fairly low temperature. Such a substance is to be present in the toner in the low crystallizing state, which is not capable of contributing to the enhancement of fixability.

Further, when an exothermic peak (P2) exists in the range exceeding 110° C., the recrystallization temperature is excessively high. As a result, the so-called fusing temperature becomes higher, and the low temperature fixability is degraded.

The endothermic peak (P1), as well as the exothermic peak (P2), is measured employing a differential scanning calorimeter (DSC). Heating and cooling conditions are as follows. After resting at 0° C. for one minute, temperature is increased at a rate of 10° C./minute up to 200° C., and a maximum endothermic peak measured during the increase in temperature is designated as P1. Then after resting at 200° C. for one minute, the temperature is decreased at a rate of 10° C./minute, and the temperature which shows the maximum exothermic peak, measured during the decrease in temperature, is designated as P2. Cited as a specific apparatus may be DSC-7 manufactured by Perkin-Elmer Corp.

<The crystalline Polyester Composition>

As a compound constituting crystalline polyester obtained by reaction of aliphatic diol with an aliphatic dicarboxylic acid (acid anhydride and acid chloride are included)is preferable.

Example of the diol which is used in order to obtain crystalline polyester includes ethylene glycol, diethylene glycol, triethylene glycol, 1,2-propylene glycol, 1,3-propylene glycol, 1,4-butane diol, 1,4-butene diol, neopentyl glycol, 1,5-pentane glycol, 1,6-hexane glycol, 1,4-cyclohexane diol, 1,4-cyclohexane di methanol, dipropylene glycol, polyethylene glycol, polypropylene glycol, poly tetramethylene glycol, bisphenol A, bisphenol Z, and hydrogenated bisphenol A.

As the dicarboxylic acid which is use in order to obtain crystalline polyester and crystalline polyamide, oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconate, n-dodecyl succinic acid, n-dodecenyl succinic acid, isododecyl succinic acid, iso dodecenyl succinic acid, n-octyl succinic acid, n-oxotenyl succinic acid, and these acid anhydride or an acid chloride can be mentioned.

In particular as a preferable crystalline polyester compound, polyester obtained by reacting cyclohexane diol or 1,4-cyclohexanedimethanol with adipic acid, polyester obtained by reacting 1,6-hexanediol or 1,4-cyclohexane dimethanol with sebacic acid, polyester obtained by reacting ethylene glycol and succinic acid, polyester obtained by reacting ethylene glycol and sebacic acid, polyester obtained by reacting 1,4-butanediol and succinic acid can be mentioned. Among these, the polyester obtained by reacting cyclohexane diol, 1,4-cyclohexanedimethanol and adipic acid is particularly preferable.

<Ratio of Crystalline Polyester>

As a containing ratio of crystalline polyester in the toner, it is preferable that crystalline polyester is from 2 to 25 percent by weight, and more preferably from 5 to 20 percent by weight, and in particular from 8 to 15 percent by weight.

<Region Containing the Crystalline Polyester in the Composite Resin Particle>

The releasing agent in a composite resin particle of the toner particles is incorporated in a region other than outermost layer, that is, center region or inter layer.

The outermost layer of the resin particle dose not contain the releasing agent which reduces adhesion strength between particles. Therefore fused toner particles having high resistant to crushing can be obtained by the composite particles since they adhere closely each other during the salting out/fusion process.

<Colorants>

The toner is obtained by salting out/fusing the composite resin particles and colored particles.

Listed as colorants which constitute the toner of the present invention may be inorganic pigments, organic pigments, and dyes.

Employed as said inorganic pigments may be those conventionally known in the art. Specific inorganic pigments are listed below.

Employed as black pigments are, for example, carbon black such as furnace black, channel black; acetylene black, thermal black, lamp black, and the like, and in addition, magnetic powders such as magnetite, ferrite, and the like.

If desired, these inorganic pigments may be employed individually or in combination of a plurality of these. Further, the added amount of said pigments is commonly between 2 and 20 percent by weight with respect to the polymer, and is preferably between 3 and 15 percent by weight.

When employed as a magnetic toner, it is possible to add said magnetite. In that case, from the viewpoint of providing specified magnetic properties, said magnetite is incorporated into said toner preferably in an amount of 20 to 60 percent by weight.

Employed as said organic pigments and dyes may be those conventionally known in the art. Specific organic pigments as well as dyes are exemplified below.

Listed as pigments for magenta or red are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, and the like.

Listed as pigments for orange or yellow are C.I. Pigment Orange 31, C.I. Pigment Orange 43, C.I. Pigment Yellow 12, C.I. Pigment Yellow 13, C.I. Pigment Yellow 14, C.I. Pigment yellow 15, C.I. Pigment Yellow 17, C.I. Pigment Yellow 93, C.I. Pigment Yellow 94, C.I. Pigment Yellow 138, C.I. Pigment Yellow 155, C.I. Pigment Yellow 156, C.I. Pigment yellow 180, C.I. Pigment Yellow 185, and the like.

Listed as pigments for green or cyan are C.I. Pigment Blue 15, C.I. Pigment Blue 15:2, C.I. Pigment Blue 15:3, C.I. Pigment Blue 16, C.I. Pigment Blue 60, C.I. Pigment Green 7, and the like.

Employed as dyes may be C.I. Solvent Red 1, 59, 52, 58, 63, 111, 122; C.I. Solvent Yellow 19, 44, 77, 79, 81, 82, 93, 98, 103, 104, 112, 162; C.I. Solvent Blue 25, 36, 60, 70, 93, and 95; and the like. Further these may be employed in combination.

If desired, these organic pigments, as well as dyes, may be employed individually or in combination of selected ones. Further, the added amount of pigments is commonly between 2 and 20 percent by weight, and is preferably between 3 and 15 percent by weight.

Said colorants may also be employed while subjected to surface modification. As said surface modifying agents may be those conventionally known in the art, and specifically, preferably employed may be silane coupling agents, titanium coupling agents, aluminum coupling agents, and the like.

Examples of the silane coupling agent include alkoxysilane such as methyltrimethoxysilane, phenyltrimethoxysilane, methylphenyldimethoxysilane and diphenyldimethoxysilane; siloxane such as hexamethyldisiloxane, γ-chloropropyltrimethoxysilane, vinyltrichlorosilane, vinyltrimethoxysilane, vinyltriethoxysilane, γ-methacryloxypropyltrimethoxysilane, γ-glycidoxypropyltrimethoxysilane, γ-mercaptopropyltrimethoxysilane, γ-aminopropyltriethoxysilane, and γ-ureidopropyltriethoxysilane.

Examples of the titanium coupling agent include those marketed with brand "Plainact" TTS, 9S, 38S, 41B, 46B, 55, 138S, 238S etc., by Ajinomoto Corporation, A-1, B-1, TOT, TST, TAA, TAT, TLA, TOG, TBSTA, A-10, TBT, B-2, B-4, B-7, B-10, TBSTA-400, TTS, TOA-30, TSDMA, TTAB, TTOP etc., marketed by Nihon Soda Co., Ltd.

Examples of the aluminum coupling agent include "Plainact AL-M".

These surface modifiers is added preferably in amount of 0.01 to 20% by weight, and more preferably 0.5 to 5% by weight with reference to the colorant.

Surface of the colorant may be modified in such way that the surface modifier is added to the dispersion of colorant, then the dispersion is heated to conduct reaction.

Colorant having subjected to the surface modification is separated by filtration and dried after repeating rinsing and filtering with the same solvent.

Additives other than the relapsing agent and/or the crystalline polyester such as charge controlling agent can be incorporated within toner particles.

Example of the charge controlling agent includes Niglosine dye, metallic salt of naphthenic acid or higher fatty acid, alcoxylated amine, tertiary ammonium chloride compounds, azo metal complex compounds, metallic salt of salicylic acid or metal complex salt thereof.

The toner according to the invention is an associated type toner obtained by salting-out/fusion-adhering the composite resin particle containing a releasing agent with the colorant.

In the toner particle, one or more domains of the releasing agent exist in a submicron region corresponding to the size of the composite resin particle. Therefore, the releasing agent is finely dispersed in the toner particle.

A sufficient amount of the releasing agent is introduced into the toner of the invention, and the amounts of the releasing agent in each of the toner particles are not scattered.

Moreover, in the composite resin particle to be subjected to the salt-out/fusion-adherence, the releasing agent which tends to lower the adhering force between the particles, is contained in a portion other than the outermost layer (in the central portion or interlayer), and the outermost layer is constituted by the low molecular weight resin having a high adhesiveness. Accordingly, the composite resin particles are strongly adhered with together to form an adhered particle (toner particle) having a high anti-crush strength.

Thus the toner according to the invention is made to a toner excellent in the anti-crush strength.

The toner according to the invention is an associated type toner obtained by salt-out/fusion-adherence of a composite resin particle containing crystalline polyester with the colorant In the toner particle, one or more domains of the releasing agent exist in a submicron region corresponding to the size of the composite resin particle. Therefore, the crystalline polyester is finely dispersed in the toner particle.

A sufficient amount of the releasing agent is introduced into the toner of the invention, and the amounts of the crystalline polyester in each of the toner particles are not scattered.

Moreover, in the composite resin particle to be subjected to the salt-out/fusion-adherence treatment, the crystalline polyester which tends to lower the adhering force between the particles is contained in a portion other than the outermost layer (in the central portion or interlayer), and the outermost layer is constituted by the low molecular weight resin having a high adhesiveness. Accordingly, the composite resin particles are strongly adhered with together to form an adhered particle (toner particle) having a high anti-crush strength.

Thus the toner according to the invention is made to a toner excellent in the anti-crush strength.

In the toner according to the invention, the difference between the shapes and the surface properties of each toner particles is very small since the toner particle is an associated type toner particle produced by fusion-adhering the composite resin particle and the colorant particle and has an irregular shaped surface from the time of the production. As a result of that, the surface properties of the toner particles are easily made uniform. Therefore, the difference of the fixing ability between each of the particles is difficultly formed and a high fixing ability can be maintained.

<The Crushability Index of Toner>

The toner according to the invention is a toner containing the resin, releasing agent and colorant, and has a crushability index according to the foregoing definition from 0.1 to 0.8.

The toner according to the invention is a toner containing the resin, crystalline polyester and colorant, and has a crushability index according to the foregoing definition from 0.1 to 0.8.

A toner having a crushability index exceeding 0.8 can not have a sufficient anti-crush strength. When such the toner is used for image formation for a long period of time, a filming, fogging and carrier spending are caused by fine particles formed by crushing of the toner particles.

A toner having a crushability index lower than 0.1 shows a tendency to raise the lowest fixing temperature and cannot satisfy the requirement of miniaturization and electric consumption reduction of the copy machine.

Herein, the toner particle diameter of the present invention is 3 to 10 $\mu$m and more preferably 3 to 8 $\mu$m in terms of the volume average particle diameter.

Particle diameter is controlled by adjusting concentration of coagulant (salting agent), amount of organic solvent, fusing time, composition of polymer during the toner preparation.

Number of fine toner particles having strong adhesion which fly to heating device and generate off-set is reduced, and high transfer performance is obtained whereby image quality of half tone, fine line, dot and so on is improved by employing the toner having average diameter of 3 to 10 $\mu$m.

It is possible to determine said volume average particle diameter of toner particles, employing a Coulter Counter TA-II, a Coulter Multisizer, SLAD 1100 (a laser diffraction type particle diameter measuring apparatus, produced by Shimadzu Seisakusho), and the like. Herein values are shown which are obtained based on the particle diameter distribution in the range of 2.0 to 40 $\mu$m, employing an aperture having an aperture diameter of 100 $\mu$m of said Coulter Counter TA-II as well as said Coulter Multisizer.

Further, the toner of the present invention is preferred in which the amount of minute toner powder having a diameter of not more than 3 $\mu$m is not more than 20 percent by number with respect to the total in term of the number distribution, and is more preferred in which the amount of minute toner powder particles having a diameter of not more than 2 $\mu$m is not more than 10 percent by number. It is possible to determine the amount of said minute toner powder particles employing an electrophoresis light scattering photometer ELS-800, produced by Ohtsuka Denshi Co. In order to adjust the particle diameter distribution to said range, the temperature during the salting-out/fusion stage, is preferably controlled in the narrow range. Specifically, the temperature is quickly increased, that is, the temperature increase rate is enhanced. These conditions have been described previously. The time to increase the temperature to said specified value is generally less than 30 minutes, and is preferably less than 10 minutes, and the temperature increase rate is preferably 1 to 15° C./minute.

The toner of the present invention preferably has a sum M of at least 70 percent. Said sum M is obtained by adding relative frequency m1 of toner particles, included in the most frequent class, to relative frequency m2 of toner particles included in the second frequent class in a histogram showing the particle diameter distribution, which is drawn in such a manner that natural logarithm lnD is used as an abscissa, wherein D (in $\mu$m) represents the particle diameter of a toner particle, while being divided into a plurality of classes at intervals of 0.23, and the number of particles is used as an ordinate.

By maintaining the sum M of the relative frequency ml and the relative frequency m2 at no less than 70 percent, the variance of the particle diameter distribution of toner particles narrows. As a result, by employing said toner in an image forming process, the minimization of generation of selective development may be secured.

In the present invention, the above-mentioned histogram showing the particle diameter distribution based on the number of particles is one in which natural logarithm lnD (wherein D represents the diameter of each particle) is divided at intervals of 0.23 into a plurality of classes (0 to 0.23, 0.23 to 0.46, 0.46 to 0.69, 0.69 to 0.92, 0.92 to 1.15, 1.15 to 1.38, 1.38 to 1.61, 1.61 to 1.84, 1,84 to 2.07, 2.07 to 2.30, 2.30 to 2.53, 2.53 to 2.76 . . . ), being based on the number of particles. Said histogram was prepared in such a manner that particle diameter data of a sample measured by a Coulter Multisizer according to conditions described below were transmitted to a computer via an I/O unit, so that in said computer, said histogram was prepared employing a particle diameter distribution analyzing program.

Measurement Conditions

Aperture: 100 $\mu$m

Sample preparation method: added to 50 to 100 $\mu$ml of an electrolytic solution (ISOTON R-11, manufactured by Coulter Scientific Japan Co) is a suitable amount of a surface active agent (a neutral detergent) and stirred. Added to the resulting mixture is 10 to 20 mg of a sample to be measured. To prepare the sample, the resulting mixture is subjected to dispersion treatment for one minute employing an ultrasonic homogenizer.

<External Additives>

For the purpose of improving fluidity as well as chargeability, and of enhancing cleaning properties, the toner of the present invention may be employed into which so-called external additives are incorporated. Said external additives are not particularly limited, and various types of fine inorganic particles, fine organic particles, and lubricants may be employed.

Employed as fine inorganic particles may be those conventionally known in the art. Specifically, it is possible to preferably employ fine silica, titanium, and alumina particles and the like. These fine inorganic particles are preferably hydrophobic.

Specifically listed as fine silica particles, for example, are commercially available R-805, R-976, R-974, R-972, R-812, and R-809, produced by Nippon Aerosil Co.; HVK-2150 and H-200, produced by Hoechst Co.; commercially available TS-720, TS-530, TS-610, H-5, and MS-5, produced by Cabot Corp; and the like.

Listed as fine titanium particles, for example, are commercially available T-805 and T-604, produced by Nippon Aerosil Co.; commercially available MT-100S, MT-100B, MT-500BS, MT-600, MT-600SS, and KA-1, produced by Teika Co.; commercially available TA-300SI, TA-500, TAF-130, TAF-510, and TAF-510T, produced by Fuji Titan Co.; commercially available IT-S, IT-OA, IT-OB, and IT-OC, produced by Idemitsu Kosan Co.; and the like.

Listed as fine alumina particles, for example, are commercially available RFY-C and C-604, produced by Nippon Aerosil Co., commercially available TTO-55, produced by Ishihara Sangyo Co., and the like.

Further, employed as fine organic particles are fine spherical organic particles having a number average primary particle diameter of 10 to 2,000 nm. Employed as such particles may be homopolymers or copolymers of styrene or methyl methacrylate.

Listed as lubricants, for example, are metal salts of higher fatty acids, such as salts of stearic acid with zinc, aluminum, copper, magnesium, calcium, and the like; salts of oleic acid with zinc, manganese, iron, copper, magnesium, and the like; salts of palmitic acid with zinc, copper, magnesium, calcium, and the like; salts of linoleic acid with zinc, calcium, and the like; and salts of ricinolic acid with zinc, calcium, and the like.

The added amount of these external agents is preferably 0.1 to 5 percent by weight with respect to the toner.

<Production Method of the Invention>

The production method according to the invention includes (I) the process for preparing the composite resin particle containing the releasing agent in a portion other than the outermost layer by a multi-step polymerization method, and (II) the process for salting-out/fusion-adhering the composite resin particle prepared in the process (I) with the colorant.

The production method according to the invention includes (I) the step for preparing the composite resin particle containing the crystalline polyester in a portion other than the outermost layer by a multi-step polymerization method, and (II) the step for salting-out/fusion-adhering the composite resin particle prepared in the step (I) and the colorant.

An example of the producing method according to the invention is comprised by the following processes:

(1) the process (I) of multi-step polymerization for preparing the composite resin particle containing the releasing agent and/or crystalline polyester in a portion other than the outermost layer (in the central portion or interlayer), (2) the process (II) of salt-out/fusion-adherence for preparing the toner particle by salting-out/fusion-adhering the composite resin particle with the colorant particle, (3) the process of filtration and was for filtering the suspension of the toner particles to separate the toner particles and washing the filtered toner particles for removing the surfactant, (4) the drying process for drying the washed toner particles, (5) the process for adding an external additive to the dried toner particles.

Each of the processes is described below.

Multi-step Polymerization Process (I)

The multi-step polymerization process (I) is a process for preparing the composite resin particle by forming the covering layer (n+1) of the polymer of a monomer (n+1) on the surface of the resin particle (n) by the multi-step polymerization method.

It is preferred from the viewpoint of the stability and the anti-crush strength of the obtained toner to apply the multi-step polymerization including three or more polymerization steps.

The two-and tree-step polymerization methods are described below.

Two-step Polymerization Method

The two-step polymerization method is a method for producing the composite resin particle comprised of the central portion (core) containing the releasing agent and/or the crystalline polyester comprising the high molecular weight resin and an outer layer (shell) comprising the low molecular weight resin.

In concrete, a monomer liquid is prepared by dissolving the releasing agent and/or the crystalline polyester in a monomer H, the monomer liquid is dispersed in an aqueous medium (an aqueous solution of a surfactant) in a form of oil drop, and the system is subjected to a polymerization treatment (the first polymerization step) to prepare a suspension of a high molecular weight resin particles H each containing the releasing agent and/or the crystalline polyester.

Next, a polymerization initiator and a monomer L to form the low molecular weight resin is added to the suspension of the resin articles H, and the monomer L is subjected to a polymerization treatment (the second polymerization step) to form a covering layer L composed of the low molecular weight resin (a polymer of the monomer L) onto the resin particle H.

Three-step Polymerization Method

The three-step polymerization method is a method for producing the composite resin particle comprised of the central portion (core) comprising the high molecular weight resin, the inter layer containing the releasing agent and/or the crystalline polyester and the outer layer (shell) comprising the low molecular weight resin.

In concrete, a suspension of the resin particles H prepared by the polymerization treatment (the first polymerization step) according to a usual procedure is added to an aqueous medium (an aqueous solution of a surfactant) and a monomer liquid prepared by dissolving the releasing agent and/or the crystalline polyester in a monomer M is dispersed in the aqueous medium. The aqueous dispersion system is subjected to a polymerization treatment (the second polymerization step) to form a covering layer M (inter layer) comprising a resin (a polymer of the monomer M) containing the releasing agent and/or the crystalline polyester onto the surface of the resin particle H (core particle). Thus a suspension of combined resin (high molecular weight resin-low molecular weight resin) particles is prepared.

Next, a polymerization initiator and a monomer L to form the low molecular weight resin is added to the suspension of the combined resin articles, and the monomer L is subjected to a polymerization treatment (the third polymerization step) to form a covering layer L composed of the low molecular weight resin (a polymer of the monomer L) onto the composite resin particle.

In the three-step polymerization method, the releasing agent and/or the crystalline polyester can be finely and uniformly dispersed by applying a procedure, at the time of forming the covering layer M on the resin particle H, that a suspension of the resin particles H is added to an aqueous medium (an aqueous solution of a surfactant) and a monomer liquid prepared by dissolving the releasing agent and/or the crystalline polyester in a monomer M is dispersed in the aqueous medium, and thus obtained system is subjected to the polymerization treatment (the second polymerization step).

Either the step of addition of the suspension of the resin particle H or the step of dispersion of the monomer liquid into the form of oil drops may be performed first or both of the steps may be performed simultaneously.

(a) An embodiment in which the resin particle to be form the central portion (core) of the composite resin particle is firstly added into the aqueous surfactant solution, then the monomer composition containing the releasing agent and/or the crystalline polyester is dispersed into the aqueous medium, and this system is subjected to the polymerization treatment to form the interlayer constituting the composite resin particle.

(b) An embodiment in which the monomer composition containing the releasing agent and/or the crystalline polyester is firstly dispersed in the aqueous surfactant solution, thereafter, the resin particle to be form the central portion (core) of the composite resin particle is added, and the system is subjected to the polymerization treatment to form the interlayer constituting the composite resin particle.

(c) An embodiment in which and the monomer composition containing the releasing agent and/or the crystalline polyester is dispersed in the aqueous surfactant solution and, at the same time, the resin particle to be form the central portion (core) of the composite resin particle is added into the aqueous solution, and the system is subjected to the polymerization treatment to form the interlayer constituting the composite resin particle.

The resin particles containing a releasing agent can be obtained as latex particles by dissolving the releasing agent in a monomer to obtain the binding resin, dispersing the monomer solution in an aqueous dispersant, and then processing polymerization.

The water based medium means one in which at least 50 percent, by weight of water, is incorporated.

Herein, components other than water may include water-soluble organic solvents. Listed as examples are methanol, ethanol, isopropanol, butanol, acetone, methyl ethyl ketone, tetrahydrofuran, and the like. Of these, preferred are alcohol based organic solvents such as methanol, ethanol, isopropanol, butanol, and the like which do not dissolve resins.

Methods for dispersing said monomer solution into a water based medium are not particularly limited. However, methods are preferred in which dispersion is carried out employing mechanical force. Said monomer solution is preferably subjected to oil droplet dispersion (essentially an embodiment in a mini-emulsion method), employing mechanical force, especially into water based medium prepared by dissolving a surface active agent at a concentration of lower than its critical micelle concentration. An oil soluble polymerization initiator may be added to the monomer solution in place of a part or all of water soluble polymerization initiator.

In the usual emulsion polymerization method, the releasing agent and/or the crystalline polyester dissolved in oil phase tends to desorb. On the other hand sufficient amount of the releasing agent and/or the crystalline polyester can be incorporated in a resin particle or covered layer by the mini-emulsion method in which oil droplets are formed mechanically.

Herein, homogenizers to conduct oil droplet dispersion, employing mechanical forces, are not particularly limited, and include, for example, "Clearmix", ultrasonic homogenizers, mechanical homogenizers, and Manton-Gaulin homogenizers and pressure type homogenizers. Further, the diameter of dispersed particles is 10 to 1,000 nm, and is preferably 30 to 300 nm.

Emulsion polymerization, suspension polymerization seed emulsion etc. may be employed as the polymerization method to form resin particles or covered layer containing the releasing agent and/or the crystalline polyester. These polymerization methods are also applied to forming resin particles or covered layer which does not contain the releasing agent and/or the crystalline polyester.

The particle diameter of composite particles obtained by the process (1) is preferably from 10 to 1,000 nm in terms of weight average diameter determined employing an electrophoresis light scattering photometer "ELS-800" (produced by Ohtsuka Denshi Co.).

Glass transition temperature (Tg) of the composite resin particles is preferably from 48 to 74° C., and more preferably from 52 to 64° C. The Softening point of the composite resin particles is preferably from 95 to 140° C.

<Salting-out/Fusion Process (II)>

Salting-out/fusion process (II) is a process to obtain particles having undefined shape (unsphered shape) in which the composite resin particles obtained by the process (I) and colorant particles are aggregated. All processes of salting-out, aggregation and fusion occur simultaneously in the preferable embodiment.

Particles of additives incorporated within toner particles such as a charge control agent (particles having average diameter from 10 to 1,000 nm) may be added as well as the composite resin particles and the colorant particles in the salting-out/fusion process (II).

Surface of the colorant particles may be modified by a surface modifier.

The colorant particles are subjected to salting out/fusion process in a state that they are dispersed in water based medium. The water based medium to disperse the colorant particles includes an aqueous solution dissolving a surfactant in concentration not less than critical micelle concentration (CMC).

Examples of the surfactant include those employed in the multi-step polymerization process.

Homogenizers employed in the dispersion of the colorant particles are not particularly limited, and include, for example, "Clearmix", ultrasonic homogenizers, mechanical homogenizers, and Manton-Gaulin homogenizers and pressure type homogenizers.

In order to simultaneously carry out salting-out and fusion, it is required that salting agent (coagulant) is added to the dispersion of composite particles and colorant particles in an amount not less than critical micelle concentration and they are heated to a temperature of the glass transition temperature (Tg) or higher of the resin constituting composite particles.

Suitable temperature for salting out/fusion is preferably from (Tg plus 10° C.) to (Tg plus 50° C.), and more preferably from (Tg plus 15° C.) to (Tg plus 40° C.).

An organic solvent which is dissolved in water infinitely may be added in order to conduct the salting out/fusion effectively.

Examples of the salting-out agents employed in the salting out/fusion process include alkaline metal salts and/or alkaline earth metal salts and the like.

Herein, listed as alkali metals and alkali earth metals, employed as salting-out agents, are, as alkali metals, lithium, potassium, sodium, and the like, and as alkali earth metals, magnesium, calcium, strontium, barium, and the like. Further, listed as those forming salts are chlorides, bromides, iodides, carbonates, sulfates, and the like.

Further, listed as organic solvents which are infinitely soluble in water are methanol, ethanol, 1-propanol, 2-propanol, ethylene glycol, glycerin, acetone, and the like. of these, preferred are alcohols having 3 or fewer carbon atoms such as methanol, ethanol, 1-propnaol, 2-propanol, and 2-propanol is particularly preferred.

Temperature of the dispersion when the salting out agent is added to the dispersion in which the composite particles and the colorant are dispersed is preferably not more than Tg of the composite particles, and concretely from 5 to 55° C., and more preferably 10 to 45° C.

In case that the temperature the dispersion when the salting out agent is added is higher than the Tg of the composite particles, it is difficult to control particle diameter and, as the result, huge particles tend to form.

It is important that the salting out agent is added with stirring the dispersion in which the composite particles and the colorant are dispersed at a temperature not more than Tg of the composite particles, and then heating of the dispersion starts without delay to attain a temperature not less than Tg of the composite particles in the salting out/fusion process (II).

Filtration and Washing Process

In said filtration and washing process, filtration is carried out in which said toner particles are collected from the toner particle dispersion, and washing is also carried out in which additives such as surface active agents, salting-out agents, and the like, are removed from the collected toner particles (a cake-like aggregate).

Herein, filtering methods are not particularly limited, and include a centrifugal separation method, a vacuum filtration method which is carried out employing a glass filter and the like, a filtration method which is carried out employing a filter press, and the like.

Drying Process

This process is one in which said washed toner particles are dried.

Listed as dryers employed in this process may be spray dryers, vacuum freeze dryers, vacuum dryers, and the like. Further, standing tray dryers, movable tray dryers, fluidized-bed layer dryers, rotary dryers, stirring dryers, and the like are preferably employed.

It is proposed that the moisture content of dried toners is preferably not more than 5 percent by weight, and is more preferably not more than 2 percent by weight.

Further, when dried toner particles are aggregated due to weak attractive forces among particles, aggregates may be subjected to crushing treatment. Herein, employed as crushing devices may be mechanical a crushing devices such as a jet mill, a Henschel mixer, a coffee mill, a food processor, and the like.

Addition Process of External Additives

This process is one in which external additives are added to dried toner particles.

Listed as devices which are employed for the addition of external additives, may be various types of mixing devices known in the art, such as tubular mixers, Henschel mixers, Nauter mixers, V-type mixers, and the like.

Besides colorants and releasing agents, materials, which provide various functions as toner materials may be incorporated into the toner of the present invention. Specifically, charge control agents are cited. Said agents may be added employing various methods such as one in which during the salting-out/fusion stage, said charge control agents are simultaneously added to resin particles as well as colorant particles so as to be incorporated into the toner, another is one in which said charge control agents are added to resin particles, and the like.

In the same manner, it is possible to employ various charge control agents known in the art, which can be dispersed in water. Specifically listed are nigrosine based dyes, metal salts of naphthenic acid or higher fatty acids, alkoxyamines, quaternary ammonium salts, azo based metal complexes, salicylic acid metal salts or metal complexes thereof.

The toner of the present invention is suitably employed to form semi-gloss images.

The "semi-gloss images", as described herein, refer to images having a standard glossiness of 17 to 37. The standard glossiness, as described in the present invention, is represented by a value determined in such a manner that an image area, in which an image forming material (toner) covers at least 90 percent of the image forming support, is measured at an incident angle of 75 degrees, employing a gloss meter VGS-1D (produced by Nihon Denshoku Kogyo Co., Ltd.) in accordance with JIS-Z8741-1983. The covering ratio of said image forming material on said image forming material was determined employing a high speed color image analysis apparatus SPICCA (produced by Nihon Avionics Co.).

In the present invention, the standard glossiness of the semi-gloss images is 17 to 37, and is preferably to be 17 to 27. When the standard glossiness is less than 17, images lack brightness and sufficient sensation of quality is not obtained. On the other hand, when the standard glossiness exceeds 37, reflection light from the front surface becomes excessive, and sufficient sensation of quality is not obtained, as well as realism is insufficient. Further, when the surface is smooth, the amount of incident light into the interior becomes greater, and colorants tend to be degraded and image degradation develops during storage. In order to minimize the degradation of colorants, it is specifically preferable that the standard glossiness be not more than 27.

<Developers>

The toner of the present invention may be employed in either a single-component developer or a two-component developer.

Listed as single-component developers are a non-magnetic single-component developer, and a magnetic single-component developer in which magnetic particles having a diameter of 0.1 to 0.5 μm are incorporated into a toner. Said toner may be employed in both developers.

Further, said toner is blended with a carrier and employed as a two-component developer. In this case, employed as magnetic particles of the carrier may be conventional materials known in the art, such as metals such as iron, ferrite, magnetite, and the like, alloys of said metals with aluminum, lead and the like. Specifically, ferrite particles are preferred. The volume average particle diameter of said magnetic particles is preferably 15 to 100 μm, and is more preferably 25 to 80 μm.

The volume average particle diameter of said carrier can be generally determined employing a laser diffraction type particle diameter distribution measurement apparatus "Helos", produced by Sympatec Co., which is provided with a wet type homogenizer.

The preferred carrier is one in which magnetic particles are further coated with resins, or a so-called resin dispersion type carrier in which magnetic particles are dispersed into resins. Resin compositions for coating are not particularly limited. For example, employed are olefin based resins, styrene based resins, styrene-acryl based resins, silicone based resins, ester based resins, or fluorine containing polymer based resins. Further, resins, which constitute said resin dispersion type carrier, are not particularly limited, and resins known in the art may be employed. For example, listed may be styrene-acryl based resins polyester resins, fluorine based resins, phenol resins, and the like.

<Image Forming Method>

The toner of the present invention is employed preferably in an image forming method comprising a fixing process employing a fixing unit composed of a heating roller and a pressure roller through which fixing is conducted.

FIG. 1 is a cross-sectional view showing an example of a fixing unit employed in the present invention. The fixing unit shown in FIG. 1 comprises heating roller 10 and pressure roller 20 which is brought into contact with said heating roller 10. Further, in FIG. 1, T is a toner image formed on a sheet of transfer paper (an image forming support).

Heating roller 10 comprises cylinder 11 having thereon covering layer 12 comprised of fluorine resins and includes heating member 13 comprised of a linear heater.

Said cylinder 11 is comprised of metal and its interior diameter is 10 to 70 mm. Metals which constitute cylinder 11 are not particularly limited, and include, for example, metals such as iron, aluminum, copper, and the like, and alloys thereof.

The wall thickness of cylinder 11 is 0.1 to 15 mm, and is determined while taking into account the balance between the demand of energy saving (by a decrease in thickness) and strength (dependent on the composition materials). For example, the some strength resulting from an iron cylinder having a wall thickness of 0.57 mm is obtained by an aluminum cylinder having a wall thickness of 0.8 mm.

Exemplified as fluorine resins constituting covering layer 12 may be PTFE (polytetrafluoroethylene), PFA (tertafluoroethylene-perfluoroalkyl vinyl ether copolymers), and the like.

The thickness of covering layer 12 is commonly 10 to 500 μm, and is preferably 20 to 400 μm.

When the thickness of covering layer 12 is less than 10 μm, it is impossible to allow said covering layer 12 to sufficiently exhibit the function as the covering layer, and also it is impossible to obtain the durability as a fixing unit. On the other hand, the surface of the covering layer having a thickness of no less than 500 μm tends to be abraded due to paper dust. Then, a toner adheres to said abrasion to result in problems with image staining.

The elastic material forming a covering layer 12 includes silicone rubber or silicone sponge, which has good heat resistance, such as LTV, RTV and HTV.

An Asker C harness of the elastic material covering layer 12 is less than 80 degrees, preferably less than 80 degrees. The thickness of the elastic material covering layer 12 is 0.1 to 30 mm.

When the Asker C hardness of elastic materials constituting covering layer 12 exceeds 80 degrees, as well as when the thickness of the covering layer is less than 0.1 mm, it is impossible to increase the fixing nip. Accordingly it is impossible to exhibit effects of soft fixing (for example, improvement of color reproduction by toner layer at a leveled interface).

Halogen heaters may be suitably employed as heating member 13.

Pressure roller 20 comprises cylinder 21 having on its surface covering layer 22 comprised of elastic materials. Elastic materials constituting covering layer 22 are not particularly limited, and may include various types of soft rubber such as urethane rubber, silicone rubber, and the like, and also foamed rubber. Silicone rubber as well as silicone sponge rubber is preferably employed, which is exemplified as those constituting covering layer 12.

The Asker C hardness of elastic materials, constituting covering layer 22, is commonly less than 80 degrees, is preferably less than 70 degrees, and is more preferably less than 60 degrees.

Further, the thickness of covering layer 22 is commonly 0.1 to 30 mm, and is preferably 0.1 to 20 mm.

When the Asker C hardness of elastic materials constituting covering layer 22 exceeds 80 degrees, as well as when the thickness of the covering layer is less than 0.1 mm, it is impossible to increase the fixing nip. Accordingly it is impossible to exhibit effects of soft fixing.

Materials constituting cylinder 21 are not particularly limited, and may include metals such as aluminum, iron, copper, and the like, and alloys thereof.

The contact load (total load) of heating roller 10 applied to pressure roller 20 is commonly 40 to 350 N, is preferably 50 to 300 N, and is more preferably 50 to 250 N. Said load is set taking into the strength (the wall thickness of cylinder 11) of heating roller 10. For example, when a heating roller comprised of an iron cylinder having a wall thickness of 0.3 mm is employed, the applied load is preferably not more than 250 N.

Further, from the viewpoint of offsetting resistance as well as fixability, nip width is preferably 4 to 10 mm, and the surface pressure of said nip is preferably $0.6\times10^5$ to $1.5\times10^5$ Pa.

When the fixing unit shown in FIG. 1 is employed, an example of fixing conditions are as follows: fixing temperature (surface temperature of heating roller 10) is 150 to 210° C., and fixing linear speed is 80 to 640 mm/second.

A fixing unit may be provided with said cleaning mechanism. Employed as cleaning systems are a system in which various types of silicone oil are supplied to a fixing film, or a system which carries out cleaning, employing a pad impregnated with silicone oil, a roller, a web and the like.

Silicone oil having high resistance to heat, for example, polydimethylsilicone, polymethylphenylsilicone etc. are employed. The silicone oil having a viscosity of 10 Pa·s at 20° C. is preferably employed because those having low viscosity is provided in excess.

Specifically, the present invention exhibits marked effects for a system in which none or a definite amount of silicone oil is used. Therefore, it is preferable to provide not more than 2 mg/A4 size sheet in case the oil is employed.

An amount of the silicone oil adhered to an image forming sheet is reduced by suppressing not more than 2 mg/A4 size sheet, and as the result, it does not hinder to write the sheet by oily pen such as ball pen. Further deterioration of off-set resistance due to denature of silicone oil according to time lapsing, contamination of optical system or charging electrodes by silicone oil can be avoided.

The providing amount of silicone oil is calculated by measuring the mass difference of fixing device (Δw) before and after putting 100 sheets of A4 size sheet through rollers of the fixing device continuously (Δw/100).

EXAMPLES

The present inventing will now be detailed with reference to examples.

Preparation Example 1

(1) Preparation of Core Particle (a First Stage Polymerization)

Placed into a 5,000 ml separable flask fitted with a stirring unit, a temperature sensor, a cooling pipe, and a nitrogen gas inlet was a surface active agent solution (water based medium) prepared by dissolving 7.08 g of an anionic surface active agent (sodium dodecylbenzenesulfonate: SDS) in 3,010 g of deionized water, and the interior temperature was raised to 80° C. under a nitrogen gas flow while stirring at 230 rpm.

Subsequently, a solution prepared by dissolving 9.2 g of a polymerization initiator (KPS) in 200 g of deionized water was added to the surface active agent solution and it was heated at 75° C., a monomer mixture solution consisting of 70.1 g of styrene, 19.9 g of n-butyl acrylate, and 10.9 g of methacrylic acid was added dropwise over 1 hour. The mixture underwent polymerization by stirring for 2 hours at 75° C. (a first stage polymerization). Thus latex (a dispersion comprised of higher molecular weight resin particles) was obtained. The resulting latex was designated as Latex (1H).

The Latex (1H) has a peak molecular weight at 138,000.

(2) Forming an Inter Layer

A monomer solution was prepared in such way that 72.0 g of Exemplified Compound 19) was added to monomer mixture solution consisting of 105.6 g of styrene, 30.0 g of n-butyl acrylate, 6.4 g of methacrylic acid, 5.6 g of n-octyl-3-mercaptopropionic acid ester and the mixture was heated to 80° C. to dissolve the monomers in a flask equipped with a stirrer.

Surfactant solution containing 1.60 of anionic surfactant SDS dissolved in 1200 ml of deionized water was heated to 80° C. To the surfactant solution 28 g (converted in solid content) the latex 1H, dispersion of core particles, was added, then the monomer solution containing the Exemplified Compound 19) was mixed and dispersed by means of a mechanical dispersion machine, "Clearmix" (produced by M Technique Ltd.) equipped with circulating pass, and a dispersion (emulsion) containing dispersion particles (oil droplet) having homogeneous particle diameter (284 nm) was prepared.

Subsequently, initiator solution containing 5.0 g of polymerization initiator (KPS) dissolved in 240 ml of deionized water, and 750 ml of deionized water were added to the dispersion (emulsion). Polymerization was conducted by stirring with heating at 80° C. for 3 hours, as the result, latex (dispersion of composite resin particles which are composed of resin particles having higher molecular weight polymer resin covered with an intermediate molecular weight polymer) was obtained (a second stage polymerization). The resulting latex was designated as Latex (1HM).

The polymers composed of composite resin particles composing the latex 1HM have peaks at molecular weight of 138,000, and 80,000.

(3) Forming Outer Layer (Third Stage Polymerization)

Polymerization initiator solution containing 7.4 g of polymerization initiator KPS dissolved in 200 ml deionized water was added to the latex 1HM, then monomer mixture solution consisting of 300 g of styrene, 95 g of n-butylacrylate, 15.3 g of methacrylic acid, and 10.4 g of n-octyl-3-mercaptoprpionic ester was added dropwise over 1 hour at temperature of 80° C. The mixture underwent polymerization by stirring with heating for 2 hours (a third stage polymerization), it was cooled to 28° C. Thus Latex 1HML composed of core composed of higher molecular weight polymer resin, an inter layer composed of an intermediate molecular weight polymer resin and an outer layer composed of lower molecular weight polymer resin in which inter layer the Exemplified Compound 19) was incorporated was obtained.

The polymers composed of composite resin particles composing the latex 1HML have peaks at molecular weight of 138,000, 80,000 and 13,000, and weight average particular size of the composite resin particles was 122 nm.

Preparation Example 2

(1) Preparation of Core Particle (a First Stage Polymerization)

A monomer solution was prepared in such way that 72.0 g of Exemplified Compound 16) was added to monomer mixture solution consisting of 105.6 g of styrene, 30.0 g of n-butyl acrylate, and 6.4 g of methacrylic acid and the mixture was heated to 80° C. to dissolve the monomers in a flask equipped with a stirrer.

Surfactant solution containing 1.60 of anionic surfactant SDS dissolved in 2700 ml of deionized water was heated to 80° C. To the surfactant solution monomer solution containing the Exemplified Compound 16) was mixed and dispersed by means of a mechanical dispersion machine, "Clearmix" (produced by M Technique Ltd.) equipped with circulating pass, and a dispersion (emulsion) containing dispersion particles (oil droplet) having homogeneous particle diameter (268 nm) was prepared.

Subsequently, initiator solution containing 5.1 g of polymerization initiator (KPS) dissolved in 240 ml of deionized water, and 750 ml of deionized water were added to the dispersion (emulsion). Polymerization was conducted by stirring with heating at 80° C. for 3 hours, as the result, latex (dispersion of resin particles having higher molecular weight polymer) was obtained (a first stage polymerization). The resulting latex was designated as Latex 2H.

(2) Forming Outer Layer (Second Stage Polymerization)

Polymerization initiator solution containing 14.8 g of polymerization initiator KPS dissolved in 400 ml deionized water was added to the latex 2H, then monomer mixture solution consisting of 600 g of styrene, 190 g of n-butylacrylate, 30.0 g of methacrylic acid, and 20.8 g of n-octyl-3-mercaptoprpionic ester was added dropwise over 1 hour at temperature of 80° C. The mixture underwent polymerization by stirring with heating for 2 hours (a second stage polymerization), it was cooled to 28° C. Thus Latex 2HL composed of core composed of higher molecular weight polymer resin, and an outer layer composed of lower molecular weight polymer resin in which core the Exemplified Compound 16) was incorporated was obtained.

The polymers composed of composite resin particles composing the latex 1HL have peaks at molecular weight of 168,000 and 11,000, and weight average molecular weight of the composite resin particles was 126 nm.

Preparation Example 3

A latex was prepared by the similar way to Preparation Example 1 except that 56 g of crystalline polyester P1, (m.p. 97° C., Mn not more than 5,300, obtained by reaction of 1,4-cyclohexanedimethanol with adipic acid was employed in place of Exemplified Compound 19) in the second stage of polymerization. The latex was composed of core composed of higher molecular weight polymer resin, an inter layer composed of an intermediate molecular weight polymer resin and an outer layer composed of lower molecular weight polymer resin in which inter layer the crystalline polyester P1 was incorporated was obtained. The latex is designated as Latex 3HML.

The polymers composed of composite resin particles composing the latex 3HML have peaks at molecular weight of 138,000, 88,000 and 12,000, and weight average molecular weight of the composite resin particles was 110 nm.

Preparation Example 4

A latex was prepared by the similar way to Preparation Example 2 except that 72.0 g of crystalline polyester P1 was employed in place of Exemplified Compound 19) in the first stage of polymerization. The latex was composed of core composed of higher molecular weight polymer resin and an outer layer composed of lower molecular weight polymer resin in which core the crystalline polyester P1 was incorporated was obtained. The latex is designated as Latex 4HL.

The polymers composed of composite resin particles composing the latex 4HL have peaks at molecular weight of 168,000 and 11,000, and weight average molecular weight of the composite resin particles was 120 nm.

Comparative Preparation Example 1

Latex 1H, a dispersion of resin particles composed of higher molecular weight polymer, was obtained in the same manner as Preparation Example 1.

The polymer composed of Latex 1H has peaks at molecular weight of 168,000, and weight average molecular weight of the composite resin particles was 90 nm.

Comparative Preparation Example 2

Initiator solution containing 14.5 g of polymerization initiator (KPS) dissolved in 240 ml of deionized water was prepared in a flask equipped with a stirrer. A monomer mixture solution consisting of 600 g of styrene, 190 g of n-butylacrylate, 30.0 g of methacrylic acid, and 20.8 g of n-octyl-3-mercaptoprpionic ester was added dropwise over 1 hour at temperature of 80° C. The mixture underwent polymerization by stirring with heating for 2 hours, it was cooled to 27° C. Thus latex, dispersion composed of resin particles of lower molecular weight polymer resin obtained. The resulting latex was designated as Latex (2L).

The polymer composed of Latex 2L has peaks at molecular weight of 11,000, and weight average molecular weight of the composite resin particles was 128 nm.

Preparation Example 1 Bk

Added to 1600 ml of deionized water were 59.0 g of sodium n-dodecylsulfate which were stirred and dissolved. While stirring the resulting solution, 420.0 g of carbon black, "Regal 330" (produced by Cabot Corp.), were gradually added, and subsequently dispersed employing a stirring unit, "Clearmix" (produced by M Technique Ltd.). Thus a colorant particle dispersion (hereinafter referred to as "Colorant Dispersion (Bk)") was prepared. The colorant particle diameter of said Colorant Dispersion (Bk) was determined employing an electrophoresis light scattering photometer "ELS-800" (produced by Ohtsuka Denshi Co.), resulting in a weight average particle diameter measurement of 98 nm.

Placed into a four-necked flask fitted with a temperature sensor, a cooling pipe, a nitrogen gas inlet unit, and a stirring unit were 420.7 g (converted in solid content) of Latex (1HML) obtained in Preparation Example 1, 900 g of deionized water, and 166 g of Colorant Dispersion (Bk) prepared as previously described, and the resulting mixture was stirred. After adjusting the interior temperature to 30° C., 5N aqueous sodium hydroxide solution was added to the resulting solution, and the pH was adjusted to 11.0. Subsequently, an aqueous solution prepared by dissolving 12.1 g of magnesium chloride tetrahydrate in 1000 ml of deionized water was added at 30° C. over 6 minutes. After setting the resulting mixture aside for 3 minutes, it was heated so that the temperature was increased to 90° C. within 6 minutes (at a temperature increase rate of 10° C./minute). While maintaining the resulting state, the diameter of coalesced particles was measured employing a "Coulter Counter TA-II". When the volume average particle diameter reached 5.5 μm, the growth of particles was terminated by the addition of an aqueous solution prepared by dissolving 80.4 g of sodium chloride in 1000 ml of deionized water, and further fusion was continually carried out at a liquid media temperature of 85 2° C. for 2 hours, while being heated and stirred (digestion process). Thereafter, the temperature was decreased to 30° C. at a rate of 8° C./minute. Subsequently, the pH was adjusted to 2.0, and stirring was terminated. The resulting coalesced particles were collected through filtration, and repeatedly washed with deionized water. Washed particles were then dried by 40° C. air, and thus colored particles containing the releasing agent (Exemplified Compound 19) and having average volume particle diameter of 5.7 μm were obtained. The colored particles obtained as previously described were designated as "Colored Particles 1 Bk".

Preparation Example 2 Bk

In accordance with composition program shown in Table 1, colored particles containing the releasing agent (Exemplified Compound 16) and having average volume particle diameter of 5.6 μm were obtained in the same way as Preparation Example 1 Bk, except that 420.7 g (converted in solid content) of Latex (2HL) obtained by Preparation Example 2 was employed in place of Latex (1HML) and digestion process was varied to 4 hours. The colored particles thus obtained were designated as "Colored Particles 2 Bk".

Preparation Example 3 Bk

In accordance with composition program shown in Table 1, colored particles containing the crystalline polyester (1) and having average volume particle diameter of 5.8 gm were obtained in the same way as Preparation Example 1 Bk, except that 420.7 g (converted in solid content) of Latex (3HML) obtained by Preparation Example 3 was employed in place of Latex (1HML). The colored particles thus obtained were designated as "Colored Particles 3 Bk".

Preparation Example 4 Bk

In accordance with composition program shown in Table 1, colored particles containing the crystalline polyester (1) and having average volume particle diameter of 5.5 μm were obtained in the same way as Preparation Example 1 Bk, except that 420.7 g (converted in solid content) of Latex (4HL) obtained by Preparation Example 2 was employed in place of Latex (1HML) and digestion process was varied to 4 hours. The colored particles thus obtained were designated as "Colored Particles 4 Bk".

Comparative Preparation Example 1 bk

Exemplified Compound 19) in an amount of 12.5 g was dispersed by a ultrasonic homogenizer in a surfactant solution (85° C.) containing 0.5 g of anionic surfactant SDS in 400 g of deionized water. The dispersion is designated as "Releasing Agent Dispersion".

In accordance with composition program shown in Table 1, colored particles containing the releasing agent Exemplified Compound 19) and having average volume particle diameter of 5.6 μm were obtained in the same way as Preparation Example 1 Bk, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (Bk) were placed into a four-necked flask fitted with a temperature sensor, a cooling pipe, a nitrogen gas inlet unit, and a stirring unit, and the resulting mixture was stirred and digestion process was varied to 4 hours. The colored particles thus obtained were designated as "Colored Particles 1 bk".

Comparative Preparation Example 2 bk

Crystalline polyester (1) in an amount of 12.5 g was dispersed by an ultrasonic homogenizer in a surfactant solution (85° C.) containing 0.5 g of anionic surfactant SDS in 400 g of deionized water. The dispersion is designated as "Crystalline Polyester Dispersion".

In accordance with composition program shown in Table 1, colored particles containing the crystalline polyester (1) and having average volume particle diameter of 5.5 μm were obtained in the same way as Preparation Example 1 Bk, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (Bk) were placed into a four-necked flask fitted with a temperature sensor, a cooling pipe, a nitrogen gas inlet unit, and a stirring unit, and the resulting mixture was stirred and digestion process was varied to 4 hours. The colored particles thus obtained were designated as "Colored Particles 2 bk".

TABLE 1

| | Latex | | | Salting/Fusion | | Digestion | |
|---|---|---|---|---|---|---|---|
| Colored Particles | Name | Releasing Agent Containing Part | Crystalline Polyester | Releasing Agent Dispersion | Crystalline Polyester Dispersion | Temp. | Time (Hours) |
| 1 Bk | 1HML | Intermediate Layer | — | — | — | 85° C. | 2 |
| 2 Bk | 2HL | Core | — | — | — | 85° C. | 4 |
| 3 Bk | 3HML | — | Intermediate Layer | — | — | 85° C. | 2 |
| 4 Bk | 4HL | — | Core | — | — | 85° C. | 4 |
| Comparative 1 bk | 1H 2L | — | — | Employed | — | 85° C. | 4 |
| Comparative 2 bk | 1H 2L | — | — | — | Employed | 85° C. | 4 |

Preparation Example 1 Y

Added to 1600 ml of deionized water were 90 g of sodium n-dodecylsulfate which were stirred and dissolved. While stirring the resulting solution, 42.0 g of dye, "C.I. Solvent Yellow 93" was gradually added, and subsequently dispersed employing a stirring unit, "Clearmix" (produced by M Technique Ltd.). Thus a colorant particle dispersion (hereinafter referred to as "Colorant Dispersion (Y)") was prepared. The colorant particle diameter of said Colorant Dispersion (Y) was determined employing an electrophoresis light scattering photometer "ELS-800" (produced by Ohtsuka Denshi Co.), resulting in a weight average particle diameter measurement of 250 nm.

Colored particles containing the releasing agent (Exemplified Compound 19) and having average volume particle diameter of 5.6 μm were obtained in the same way as Preparation Example 1 Bk, except that 166 g of Colorant Dispersion (Y) was employed in place of Colorant Dispersion (Bk) and digestion time was varied to 4 hours. The colored particles obtained as previously described were designated as "Colored Particles 1 Y".

Preparation Example 2 Y

In accordance with composition program shown in Table 2, colored particles containing the releasing agent (Exemplified Compound 16) and having average volume particle diameter of 5.6 μm were obtained in the same way as Preparation Example 1 Y, except that 420.7 g (converted in solid content) of Latex (2HL) obtained by Preparation Example 2 was employed in place of Latex (1HML). The colored particles thus obtained were designated as "Colored Particles 2 Y".

Preparation Example 3 Y

In accordance with composition program shown in Table 2, colored particles containing the crystalline polyester (1) and having average volume particle diameter of 5.7 μm were obtained in the same way as Preparation Example 1 Y, except that 420.7 g (converted in solid content) of Latex (3HML) obtained by Preparation Example 3 was employed in place of Latex (1HML). The colored particles thus obtained were designated as "Colored Particles 3 Y".

Preparation Example 4 Y

In accordance with composition program shown in Table 1, colored particles containing the crystalline polyester (1) and having average volume particle diameter of 5.5 μm were obtained in the same way as Preparation Example 1 Y, except that 420.7 g (converted in solid content) of Latex (4HL) obtained by Preparation Example 4 was employed in place of Latex (1HML). The colored particles thus obtained were designated as "Colored Particles 4 Y".

Comparative Preparation Example 1 y

Exemplified Compound 19) in an amount of 12.5 g was dispersed by a ultrasonic homogenizer in a surfactant solution (85° C.) containing 0.5 g of anionic surfactant SDS in 400 g of deionized water. The dispersion is designated as "Releasing Agent Dispersion".

In accordance with composition program shown in Table 2, colored particles containing the releasing agent Exemplified Compound 19) and having average volume particle diameter of 5.6 μm were obtained in the same way as Preparation Example 1 Y, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (Y) were placed into a four-necked flask fitted with a temperature sensor, a cooling pipe, a nitrogen gas inlet unit, and a stirring unit, and the resulting mixture was stirred. The colored particles thus obtained were designated as "Colored Particles 1 Y".

Comparative Preparation Example 2 y

Crystalline polyester (1) in an amount of 12.5 g was dispersed by an ultrasonic homogenizer in a surfactant solution (85° C.) containing 0.5 g of anionic surfactant SDS in 400 g of deionized water. The dispersion is designated as "Crystalline Polyester Dispersion".

In accordance with composition program shown in Table 1, colored particles containing the crystalline polyester (1) and having average volume particle diameter of 5.5 μm were obtained in the same way as Preparation Example 1 Y, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (Y) were placed into a four-necked flask fitted with a temperature sensor, a cooling pipe, a nitrogen gas inlet unit, and a stirring unit, and the resulting mixture was stirred. The colored particles thus obtained were designated as "Colored Particles 2 y".

Preparation Example 1 M

Added to 1600 ml of deionized water were 90 g of sodium n-dodecylsulfate which were stirred and dissolved. While stirring the resulting solution, 26.3 g of dye, "C.I. Pigment Red 122" was gradually added, and subsequently dispersed employing a stirring unit, "Clearmix" (produced by M Technique Ltd.). Thus a colorant particle dispersion (hereinafter referred to as "Colorant Dispersion (M)") was prepared. The colorant particle diameter of said Colorant Dispersion (M) was determined employing an electrophoresis light scattering photometer "ELS-800" (produced by Ohtsuka Denshi Co.), resulting in a weight average particle diameter measurement of 221 nm.

Colored particles containing the releasing agent (Exemplified Compound 19) and having average volume particle diameter of 5.6 μm were obtained in the same way as Preparation Example 1 Bk, except that 166 g of Colorant Dispersion (Y) was employed in place of Colorant Dispersion (Bk) and digestion time was varied to 4 hours. The colored particles obtained as previously described were designated as "Colored Particles 1 M".

Preparation Example 2 M

In accordance with composition program shown in Table 2, colored particles containing the releasing agent (Exemplified Compound 16) and having average volume particle diameter of 5.6 μm were obtained in the same way as Preparation Example 1 M, except that 420.7 g (converted in solid content) of Latex (2HL) obtained by Preparation Example 2 was employed in place of Latex (1HML). The colored particles thus obtained were designated as "Colored Particles 2 M".

Preparation Example 3 M

In accordance with composition program shown in Table 2, colored particles containing the crystalline polyester (1) and having average volume particle diameter of 5.6 μm were obtained in the same way as Preparation Example 1 M, except that 420.7 g (converted in solid content) of Latex (3HML) obtained by Preparation Example 3 was employed in place of Latex (1HML). The colored particles thus obtained were designated as "Colored Particles 3 M".

Preparation Example 4 M

In accordance with composition program shown in Table 1, colored particles containing the crystalline polyester (1) and having average volume particle diameter of 5.8 μm were obtained in the same way as Preparation Example 1 M, except that 420.7 g (converted in solid content) of Latex (4HL) obtained by Preparation Example 4 was employed in place of Latex (1HML). The colored particles thus obtained were designated as "Colored Particles 4 M".

Comparative Preparation Example 1 m

Exemplified Compound 19) in an amount of 12.5 g was dispersed by a ultrasonic homogenizer in a surfactant solution (85° C.) containing 0.5 g of anionic surfactant SDS in 400 g of deionized water. The dispersion is designated as "Releasing Agent Dispersion".

In accordance with composition program shown in Table 2, colored particles containing the releasing agent Exemplified Compound 19) and having average volume particle diameter of 5.6 μm were obtained in the same way as Preparation Example 1 M, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (M) were placed into a four-necked flask fitted with a temperature sensor, a cooling pipe, a nitrogen gas inlet unit, and a stirring unit, and the resulting mixture was stirred. The colored particles thus obtained were designated as "Colored Particles 1 m", Comparative Preparation Example 2 m Crystalline polyester (1) in an amount of 12.5 g was dispersed by an ultrasonic homogenizer in a surfactant solution (85° C.) containing 0.5 g of anionic surfactant SDS in 400 g of deionized water. The dispersion is designated as "Crystalline Polyester Dispersion".

In accordance with composition program shown in Table 1, colored particles containing the crystalline polyester (1) and having average volume particle diameter of 5.9 μm were obtained in the same way as Preparation Example 1 M, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (M) were placed into a four-necked flask fitted with a temperature sensor, a cooling pipe, a nitrogen gas inlet unit, and a stirring unit, and the resulting mixture was stirred. The colored particles thus obtained were designated as "Colored Particles 2 m".

Preparation Example 1 C

Added to 1600 ml of deionized water were 90 g of sodium n-dodecylsulfate which were stirred and dissolved. While stirring the resulting solution, 26.3 g of dye, "C.I. Pigment Blue 15:3" was gradually added, and subsequently dispersed employing a stirring unit, "Clearmix" (produced by M Technique Ltd.). Thus a colorant particle dispersion (hereinafter referred to as "Colorant Dispersion (C)") was prepared. The colorant particle diameter of said Colorant Dispersion (C) was determined employing an electrophoresis light scattering photometer "ELS-800" (produced by Ohtsuka Denshi Co.), resulting in a weight average particle diameter measurement of 217 nm.

Colored particles containing the releasing agent (Exemplified Compound 19) and having average volume particle diameter of 5.6 μm were obtained in the same way as Preparation Example 1 Bk, except that 166 g of Colorant Dispersion (C) was employed in place of Colorant Dispersion (Bk) and digestion time was varied to 4 hours. The colored particles obtained as previously described were designated as "Colored Particles 1 C".

Preparation Example 2 C

In accordance with composition program shown in Table 2, colored particles containing the releasing agent (Exemplified Compound 16) and having average volume particle diameter of 5.6 μm were obtained in the same way as Preparation Example 1 C, except that 420.7 g (converted in solid content) of Latex (2HL) obtained by Preparation Example 2 was employed in place of Latex (1HML). The colored particles thus obtained were designated as "Colored Particles 2 M".

Preparation Example 3 M

In accordance with composition program shown in Table 2, colored particles containing the crystalline polyester (1)

and having average volume particle diameter of 5.6 μm were obtained in the same way as Preparation Example 1 C, except that 420.7 g (converted in solid content) of Latex (3HML) obtained by Preparation Example 3 was employed in place of Latex (1HML). The colored particles thus obtained were designated as "Colored Particles 3 C".

Preparation Example 4 M

In accordance with composition program shown in Table 1, colored particles containing the crystalline polyester (1) and having average volume particle diameter of 5.8 μm were obtained in the same way as Preparation Example 1 C, except that 420.7 g (converted in solid content) of Latex (4HL) obtained by Preparation Example 4 was employed in place of Latex (1HML). The colored particles thus obtained were designated as "Colored Particles 4 C".

Comparative Preparation Example 1 c

Exemplified Compound 19) in an amount of 12.5 g was dispersed by a ultrasonic homogenizer in a surfactant solution (85° C.) containing 0.5 g of anionic surfactant SDS in 400 g of deionized water. The dispersion is designated as "Releasing Agent Dispersion".

In accordance with composition program shown in Table 2, colored particles containing the releasing agent Exemplified Compound 19) and having average volume particle diameter of 5.9 μm were obtained in the same way as Preparation Example 1 C, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (C) were placed into a four-necked flask fitted with a temperature sensor, a cooling pipe, a nitrogen gas inlet unit, and a stirring unit, and the resulting mixture was stirred. The colored particles thus obtained were designated as "Colored Particles 1 c".

Comparative Preparation Example 2 c

Crystalline polyester (1) in an amount of 12.5 g was dispersed by an ultrasonic homogenizer in a surfactant solution (85° C.) containing 0.5 g of anionic surfactant SDS in 400 g of deionized water. The dispersion is designated as "Crystalline Polyester Dispersion".

In accordance with composition program shown in Table 1, colored particles containing the crystalline polyester (1) and having average volume particle diameter of 5.8 μm were obtained in the same way as Preparation Example 1 C, except that 250 g (converted in solid content) of Latex (1H) obtained in Comparative Preparation Example 1, 1000 g (converted in solid content) of Latex (2L) obtained in Comparative Preparation Example 2, and 495 g of Colorant Dispersion (C) were placed into a four-necked flask fitted with a temperature sensor, a cooling pipe, a nitrogen gas inlet unit, and a stirring unit, and the resulting mixture was stirred. The colored particles thus obtained were designated as "Colored Particles 2 c".

TABLE 2

| | Latex | | | Salting/Fusion | | Digestion | |
|---|---|---|---|---|---|---|---|
| Colored Particles | Name | Releasing Agent Containing Part | Crystalline Polyester | Releasing Agent Dispersion | Crystalline Polyester Dispersion | Temp. | Time (Hours) |
| 1 Y | 1HML | Intermediate Layer | — | — | — | 85° C. | 4 |
| 2 Y | 2HL | Core | — | — | — | 85° C. | 4 |
| 3 Y | 3HML | — | Intermediate Layer | — | — | 85° C. | 4 |
| 4 Y | 4HL | — | Core | — | — | 85° C. | 4 |
| Comparative 1 y | 1H 2L | — | — | Employed | — | 85° C. | 4 |
| Comparative 2 y | 1H 2L | — | — | — | Employed | 85° C. | 4 |
| 1 M | 1HML | Intermediate Layer | — | — | — | 85° C. | 4 |
| 2 M | 2HL | Core | — | — | — | 85° C. | 4 |
| 3 M | 3HML | — | Intermediate Layer | — | — | 85° C. | 4 |
| 4 M | 4HL | — | Core | — | — | 85° C. | 4 |
| Comparative 1 m | 1H 2L | — | — | Employed | — | 85° C. | 4 |
| Comparative 2 m | 1H 2L | — | — | — | Employed | 85° C. | 4 |
| 1 C | 1HML | Intermediate Layer | — | — | — | 85° C. | 4 |
| 2 C | 2HL | Core | — | — | — | 85° C. | 4 |
| 3 C | 3HML | — | Intermediate Layer | — | — | 85° C. | 4 |
| 4 C | 4HL | — | Core | — | — | 85° C. | 4 |
| Comparative 1 c | 1H 2L | — | — | Employed | — | 85° C. | 4 |
| Comparative 2 c | 1H 2L | — | — | — | Employed | 85° C. | 4 |

Hydrophobic silica (having a number average primary particle diameter of 10 nm, a degree of hydrophobicity of 63) and hydrophobic titanium (having a number average primary particle diameter of 25 nm, a degree of hydrophobicity of 60) were added to each of Colored Particles 1 Bk through 4 Bk, and Comparative Colored Particles 1 bk and 2 bk, Colored Particles 1 Y through 4 Y, and Comparative Colored Particles 1 y and 2 y, Colored Particles 1 M through 4 M, and Comparative Colored Particles 1 m and 2 m, and Colored Particles 1 C through 4 C, and Comparative Colored Particles 1 c and 2 c, so as to result in a ratio of 1.0 percent by weight and 1.2 percent by weight, respectively. The resulting mixtures were blended, employing a Henschel mixer, whereby a toner was obtained. No differences were found among the colored particles with respect to the shape, the particle diameter, and the like by addition of the hydrophobic silica and hydrophobic titanium.

Crushability indices of the colored particles into which the hydrophobic silica and hydrophobic titanium were incorporated were measured. The result is shown in Table 3.

A heating roller (an upper roller) was prepared by covering the surface of an aluminum alloy cylinder (having an interior diameter of 30 mm, a wall thickness of 1.0 mm, and a total length of 310 mm), having a heater at the central section, with sponge-like silicone rubber (having an Asker C hardness of 30 degrees and a thickness of 2 mm). On the other hand, a pressure roller (a lower roller) was prepared by covering the surface of iron cylinder (having an interior diameter of 40 mm and a wall thickness of 2.0 mm) with a sponge-like silicone rubber (having an Asker hardness of 30 degrees and a thickness of 8 mm). Said heating roller was brought into contact with said pressure roller under an application of total load of 150 N to form a nip having a width of 5.8 mm. Employing said fixing unit, a linear speed for printing was set at 180 mm/second. Surface of the heating roller was covered with a tube made of tetrafluoroethylene-perfluoroalkyl vinylether copolymer (PFA) having thickness of 50 μm.

Further, employed as a cleaning mechanism was a supply method of a web system impregnated with polydiphenylsilicone (having a viscosity of 10 Pa·s at 20° C.). Fixing temperature was controlled by the surface temperature of said heating roller. Setting temperature was 175° C. Further, the coating amount of said silicone oil was adjusted to 0.1 mg/A4 sized sheet.

TABLE 3

| Colored Particle | Crushability index | Colored Particle | Crushability index | Colored Particle | Crushability index | Colored Particle | Crushability index |
|---|---|---|---|---|---|---|---|
| 1 Bk | 0.24 | 1 Y | 0.30 | 1 M | 0.26 | 1 C | 0.22 |
| 2 Bk | 0.68 | 2 Y | 0.65 | 2 M | 0.66 | 2 C | 0.70 |
| 3 Bk | 0.16 | 3 Y | 0.21 | 3 M | 0.22 | 3 C | 0.18 |
| 4 Bk | 0.71 | 4 Y | 0.69 | 4 M | 0.68 | 4 C | 0.64 |
| Comp. 1 bk | 2.45 | Comp. 1 y | 2.82 | Comp. 1 m | 2.90 | Comp. 1 c | 2.55 |
| Comp. 2 bk | 2.21 | Comp. 2 y | 2.71 | Comp. 2 m | 2.80 | Comp. 2 c | 2.44 |

Developers were prepared by mixing each of the colored particles into which the hydrophobic silica and hydrophobic titanium were incorporated with ferrite carrier, coated with silicone resin and having volume average particle diameter of 60 μm. Toner concentration was set as 6% by weight. Thus developers were prepared. The resulting developers were designated as Developers 1Bk through 4Bk, Comparative Developers 1bk and 2bk, Developers 1Y through 4Y, Comparative Developers 1y and 2y, Developers 1M through 4M, Comparative Developers 1m and 2m, Developers 1C through 4C and Comparative Developers 1C and 2c, corresponding to Colored Particles 1Bk through 4Bk, Comparative Colored Particles 1bk and 2bk, Colored Particles 1Y through 4Y, Comparative Colored Particles 1y and 2y, Colored Particles 1M through 4M, Comparative Colored Particles 1m and 2m, Colored Particles 1C through 4C and Comparative Colored Particles 1c and 2c, respectively.

Examples 1 through 4 and Comparative Examples 1 and 2

Actual copying test was conducted for each of the developers obtained above employing an intermediate transfer type color copying machine 7823 manufactured by Konica Corporation. A full-color image (having a pixel ratio of 15 percent for each yellow, magenta, cyan and black image) was continually printed out under the high temperature and normal humidity (33° C. and 50% RH).and evaluation was carried out on minimum fixing temperature, temperature at which off set generates, generation of filming. The result is summarized in Table 4.

Blade type cleaning unit was employed in the copying machine for the test.

Pressure contact system fixing units as shown in FIG. 1 was employed in the copying machine for the test. The configuration of the practical fixing unit is detailed below.

Measurement and Evaluation (1) Minimum Fixing Temperature

Fixing ratio was measured for images subjected to fixing at temperature at every 5° C. from 120° C. to 200° C. by raising temperature, and the minimum temperature at which fixing ratio reached 90% was measured as the minimum fixing temperature.

Fixing Ratio

A mending tape manufactured by Sumitomo 3M Co., Ltd., was adhered to a fixed image and it was peeled off. Reflective image density before and after the adhesion and peeling off of the mending tape was measured by a reflective densitometer manufactured by Macbeth Co., and the ratio (Image density after the adhesion and peeling off/Image density before the adhesion and peeling off) was recorded as the fixing ratio.

(2) Hot Off Set

White transferee sheet was put through the rollers of the fixing device just after forming a fixed image of the test copying machine from which a cleaning device was taken off at temperature of the heating roller every 5° C. from 170° C. to 240° C., by raising temperature. A minimum temperature at which image stain was found (Off set generating temperature) was measured.

(3) Winding Characteristics

Temperature of the heating roll (fixing temperature) was lowered at every 5° C. from 200° C. to 110° C., a sheet having fixed image formed by an original having solid black line of 20 mm width at 3 mm from the leading edge was put through the fixing rollers. Maximum temperature at which the sheet winded on to the heating roller was measured.

(4) Fog Characteristics

A full-color image (having a pixel ratio of 15 percent for each yellow, magenta, cyan and black image) was continually printed onto 1,000 sheets then electric power was shut off for 2 hours to rest the machine, (this operation was designated as 1 cycle) under the high temperature and normal humidity (33° C. and 50% RH). Totally 100-cylce operation (100,000 sheets copying) was performed.

During the operation, number of the sheet on which the first staining (fogging) was observed was recorded.

(5) Filming on the Photoreceptor

Photoreceptor was visually observed in each rest time during the test, and the number of sheets at which the adhesion of foreign material on the photoreceptor was observed was recorded.

TABLE 4

| | Black Developer | Yellow Developer | Magenta Developer | Cyan Developer | Minimum Fixing Temp. (° C.) | Temp. Off Set Found (° C.) | Temp. Winding Found (° C.) | Fogging (Sheets) | Filming (Sheets) |
|---|---|---|---|---|---|---|---|---|---|
| Example 1 | 1 Bk | 1 Y | 1 M | 1 C | 140 | Over 240 | 115 | Not Found | Not Found |
| Example 2 | 2 Bk | 2 Y | 2 M | 2 C | 145 | Over 240 | 120 | Not Found | Not Found |
| Example 3 | 3 Bk | 3 Y | 3 M | 3 C | 135 | 230 | 120 | Not Found | Not Found |
| Example 4 | 4 Bk | 4 Y | 4 M | 4 C | 140 | 230 | 125 | Not Found | Not Found |
| Comparative Example 1 | Comp. 1 bk | Comp. 1 y | Comp. 1 m | Comp. 1 c | 180 | 200 | 145 | 40,000 | 60,000 |
| Comparative Example 2 | Comp. 2 bk | Comp. 2 y | Comp. 2 m | Comp. 2 c | 170 | 180 | 150 | 20,000 | 50,000 |

The invention has the following advantages.

The toner is constituted by a resin having a designated molecular weight distribution and the variation of the composition, molecular weight and the surface property between the individual particles is small.

The toner has a high anti-offset ability and a high anti-winding ability while maintaining a sufficient adhesiveness to the image support.

The toner does not give off a bad smell in the process of image formation and the fixation by heat.

The toner is excellent in the charging property and capable of forming an image having a high sharpness.

The toner is excellent in the anti-crush property and does not form a fine powder causing filming, fogging and toner spending.

The toner has a wide fixing performable temperature range.

The image forming method enables to form an excellent image having high resolution for long period hard to generate winding of the image sheet on the photoreceptor and off set phenomenon.

What is claimed is:

1. A toner for developing an electrostatic latent image which is produced by salt-out/fusion-adherence of a composite resin particle and a colorant particle, 1wherein the toner has crushability index of from 0.1 to 0.8, and said composite resin particle comprises a core and an outermost layer, 1a resin of the outermost layer of the composite resin particle has a peak or shoulder within the range of from 1,000 to 50,000 in molecular weight distribution measured by GPC, 1a resin of a core of the composite resin particle has a peak or shoulder within the range of from 100,000 to 1,000,000 in molecular weight distribution measured by GPC, and 1the composite resin particle comprises a releasing agent or a crystalline polyester compound in a portion of the composite resin particle other than the outermost layer.

2. The toner of claim 1, wherein the composite resin particle has an interlayer between the core and the outermost layer, a resin of the interlayer has a peak or shoulder within the range of from 25,000 to 150,000 in molecular weight distribution measured by GPC.

3. The toner of claim 1, wherein an average particle diameter of the composite resin particles is from 10 to 1,000 nm.

4. The toner of claim 3, wherein a glass transition temperature (Tg) of a resin component of the toner is from 48 to 74° C., a softening point of resin component of the toner is from 95 to 140° C., the releasing agent or the crystalline polyester compound has a melting point of from 50 to 130° C., an amount of the releasing agent in the toner is from 1 to 30 percent by weight, or an amount of the crystalline polyester compound in the toner is from 2 to 25 percent by weight.

5. The toner of claim 4, wherein the releasing agent is a compound represented by formula (1)

$$R_1\text{—}(OCO\text{—}R_2)_n \qquad (1)$$

1wherein $R_1$ and $R_2$ each represent a hydrocarbon group having from 1 to 40 carbon atoms which may have a substituent, and n represents an integer of 1 to 4, or number average molecular weight of crystalline polyester compound is between 1,500 and 15,000.

6. The toner of claim 1, wherein a glass transition temperature (Tg) of a resin component of the toner is from 48 to 74° C.

7. The toner of claim 1, wherein a softening point of a resin component of the toner is from 95 to 140° C.

8. The toner of claim 1, wherein the releasing agent or the crystalline polyester compound has a melting point of from 50 to 130° C.

9. The toner of claim 1 wherein the toner has crushability index of from 0.1 to 0.8, and the releasing agent is a compound represented by formula (1), $$R^1\text{—}(OCO\text{—}R^2)_n \qquad (1)$$

wherein $R^1$ and $R^2$ each represent a hydrocarbon group having from 1 to 40 carbon atoms which may have a substituent, and n represents an integer of 1 to 4.

10. The toner of claim 1, wherein number average molecular weight of the crystalline polyester compound is between 1,500 and 15,000.

11. The toner of claim 1, where an amount of the releasing agent in the toner is from 1 to 30 percent by weight, or an amount of the crystalline polyester compound in the toner is from 2 to 25 percent by weight.

12. The toner of claim 1, wherein the toner is produced by salt-out/fusion adherence of a composite resin particle which is obtained by multi-step polymerization process and a colorant particle.

13. A toner for developing an electrostatic latent image produced by salt-out/fusion adherence of a composite resin particle which is obtained by multi-step polymerization process and a colorant particle in which a releasing agent or a crystalline polyester compound is contained in a portion of the composite resin particle other than the outermost layer wherein the composite resin particle is prepared by a two-step polymerization process, the composite resin particle has a core comprising a high molecular weight resin having a peak or shoulder molecular weight within the range of from 100,000 to 1,000,000 measured by GPC and an outer layer (shell) comprising a low molecular weight resin having a peak or shoulder molecular weight within the range of from 1,000 to 50,000 measured by GPC, and the central portion (core) contains a releasing agent or a crystalline polyester compound.

14. A toner for developing an electrostatic latent image produced by salt-out/fusion adherence of a composite resin particle which is obtained by multi-step polymerization process and a colorant particle in which a releasing agent or a crystalline polyester compound is contained in a portion of the composite resin particle other than the outermost layer, 1wherein the composite resin particle is prepared by a three-step polymerization process, the composite resin particle has a central portion comprising a high molecular weight resin having a peak or shoulder molecular weight within the range of from 100,000 to 1,000,000 in molecular weight distribution measured by GPC, an inter layer comprising a resin having a peak or shoulder molecular weight within the range of from 25,000 to 150,000 in molecular weight distribution measured by GPC, and the outermost layer comprising a low molecular weight resin having a peak or shoulder molecular weight within the range of from 1,000 to 50,000 in molecular weight distribution measured by GPC, and 1the interlayer contains a releasing agent or a crystalline polyester compound.

15. A toner production method comprising, forming a composite resin particle comprising a core and an outermost layer and containing a releasing agent or a crystalline polyester compound in a portion of the particle other than the 1wherein said core comprises a high molecular weight resin having a peak or shoulder molecular weight within the range of from 1000,000 to 1,000,000 measured by GPC and said outermost layer comprises a low molecular weight resin having a peak or shoulder molecular weight within the range of from 1,000 to 50,000 measured by GPC, and the core contains a releasing agent or a crystalline polyester compound.

* * * * *